United States Patent [19]

Pilkenton

[11] Patent Number: 5,206,944
[45] Date of Patent: Apr. 27, 1993

[54] HIGH SPEED ANALOG TO DIGITAL CONVERTER BOARD FOR AN IBM PC/AT

[75] Inventor: Michael D. Pilkenton, Huber Heights, Ohio

[73] Assignee: The United States of America as represented by the Secretary of the Air Force, Washington, D.C.

[21] Appl. No.: 535,002

[22] Filed: Jun. 7, 1990

[51] Int. Cl.$^5$ .............................................. G06F 1/00
[52] U.S. Cl. ..................... 395/425; 364/DIG. 2; 364/926; 364/966.1; 364/966.3; 364/968; 341/159
[58] Field of Search ... 364/200 MS File, 900 MS File; 341/159; 365/230.03, 230.04; 395/400, 425, 162, 164; 345/230.03, 230.04

[56] References Cited

U.S. PATENT DOCUMENTS

| | | | |
|---|---|---|---|
| 3,371,337 | 2/1968 | Williams, Jr. | 340/347 |
| 4,143,366 | 3/1979 | Lewis, Jr. | 340/347 |
| 4,639,715 | 1/1987 | Doluca | 340/347 |
| 4,727,491 | 2/1988 | Culley | 364/200 |
| 4,748,573 | 5/1988 | Sarandrea et al. | 364/551 |
| 4,849,937 | 7/1989 | Yoshimoto | 365/189.05 |
| 5,047,769 | 9/1991 | Engeler et al. | 341/118 |
| 5,051,929 | 9/1991 | Tutt et al. | 364/521 |

*Primary Examiner*—Joseph L. Dixon
*Assistant Examiner*—Rebecca L. Rudolph
*Attorney, Agent, or Firm*—Bernard E. Franz; Donald J. Singer

[57] ABSTRACT

A digitizer, which comprises integrated circuit cards designed to attach to an expansion slot in an IBM PC/AT, operates at 20 megasamples per second for approximately 52 milliseconds and provides eight bit resolution on the signal input. The computer software includes a device driver for the digitizer. A flash analog-to-digital converter (ADC) in a single IC package has an analog input coupled to the video signal source. The data line from the ADC circuit goes to a SRAM (Static Random Access Memory) memory made up of four identical banks which are interleaved together so that slower less costly memory chips can be used. An interface circuit provides communication between the computer and the digitizer, with address, data and control lines. A sync pulse from the video tape unit is monitored by a sync pulse input comparator to trigger the start of a digitizing sequence.

6 Claims, 14 Drawing Sheets

HIGH SPEED ANALOG TO DIGITAL CONVERTER BOARD FOR AN IBM PC/AT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a high speed analog-to-digital converter for use with a personal computer, and more particularly to a converter board for an IBM PC/AT.

There are situations in which signals in the form of pulses are captured and stored in analog form on a medium such as video tape for later analysis. It is desired that the signals when read from the tape be sampled at a high rate, and that the amplitude value of each sample be digitized and transferred to a computer for the analysis.

The prior method of performing this A-to-D conversion was minicomputer based with a very complex expensive circuit and was not reliable.

United States patents of interest include No. 3,371,337, to Williams, Jr., which discloses a simple construction and increased speed. The patented converter is described as smaller, less expensive, simpler and more reliable than previous constructions. A high speed analog-to-digital converter is also set forth in U.S. Pat. No. 4,143,366 to Lewis, Jr. This patent speaks or an analog sample rate of 40 MHz with a 25 nanosecond spacing. U.S. Pat. No. 4,639,715 to Doluca describes a flash converter and high speed microprocessor compatible analog-to-digital converter circuit.

SUMMARY OF THE INVENTION

An objective of the invention is to provide a high speed, low cost analog-to-digital converter for use as an expansion card on a personal computer such as an IBM PC/AT. Another objective is to provide a high speed converter with a long duration sampling rate.

The invention relates to a digitizer which operates at 20 megasamples per second for approximately 52 milliseconds and provides eight bit resolution on the signal input. The computer software includes a device driver for the digitizer. The prototype embodiment comprises integrated circuit cards designed to attach to an expansion slot in an IBM PC/AT. A flash analog-to-digital converter (ADC) in a single IC package has an analog input coupled to the video signal source. The data line from the ADC circuit goes to a SRAM (Static Random Access Memory) memory made up of four identical banks which are interleaved together so that slower less costly memory chips can be used. An interface circuit provides communication between the computer and the digitizer, with address, data and control lines. A sync pulse from the video tape unit is monitored by a sync pulse input comparator to trigger the start of a digitizing sequence.

BRIEF DESCRIPTION OF THE DRAWING

FIG. 15 is an illustration showing high to low edge transition of a signal due to propagation delay tolerances;

DETAILED DESCRIPTION

Chapter I. GENERAL DESCRIPTION AND SPECIFICATIONS

The PC2000 Digitizer is a complete wideband analog-to-digital conversion system on boards which will fit into two IBM XT/AT compatible slots. The system features digital sampling rates up to and including 20 MHz with 8-bit resolution. High speed SRAM (Static Random Access Memory) is used to provide on-board storage capacity equal to 1 megabyte by 8 bits. This equates to a total of 52.4 milliseconds worth of data digitized at the full 20 MHz rate. The PC2000 system is designed for quick and easy snapshot digitization in a laboratory environment.

The system can be completely configured and operated through software written on the host computer. Sampling rates can be selected via the software and include a choice of 1.25, 2.5, 5.0, 10.0, or 20.0 MHz internal clock frequencies, or the choice of an external clock input. Data is stored via software transfer from the on-board SRAM to a hard disk drive in the host computer (up to 52.4 msec) via keyboard entry.

Figure 1:
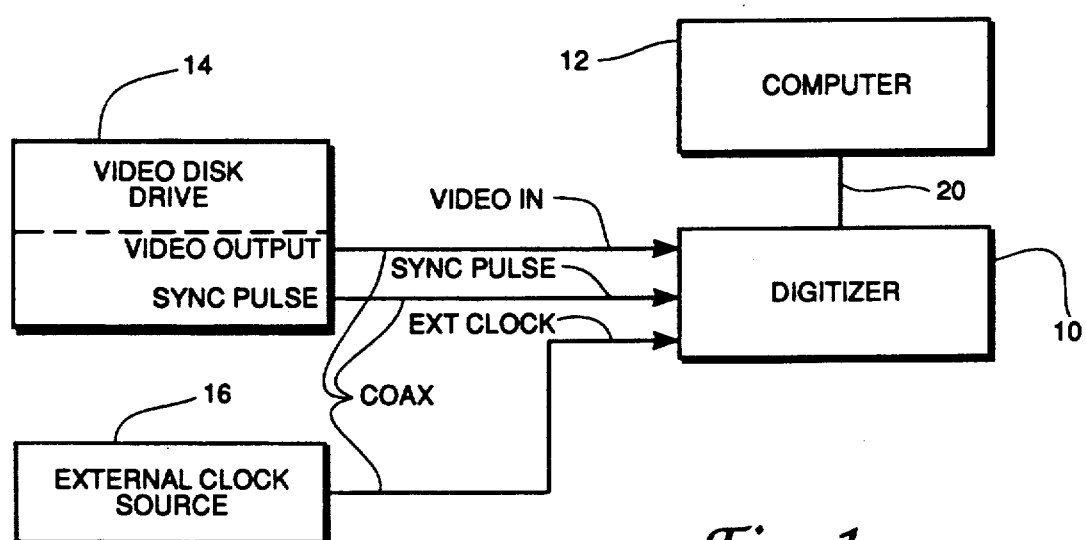
FIG. 1 is a block diagram of a complete digitizing system and connections.

FIG. 1 is a block diagram illustrating the needed hardware and connections for a complete PC2000 digitizing system and connections. The digitizer 10 comprises two boards mounted in slots in an IBM XT/AT compatible computer 12, with an interface line 20. A video disk drive unit 14 and an external clock source 16 complete the system.

The primary use for the PC2000 digitizer is for analog-to-digital conversion of wideband analog tapes, specifically 6 MHz tapes. The digitizer can however digitize any wideband signal from dc to 10 MHz. The desired signal will typically be stored on any of various video disk drives and digitized by the PC2000. The primary users for the system will be signals analysts and processors. The video disk drives in unit 14 will provide on a coax line 24 a sync pulse necessary to trigger the PC2000 digitizer. The connection along with the video input signal on a coax line 22 and external clock input on a coax line 26 are made via BNC connectors on the back of the printed circuit card.

| PC 2000 OPERATING SPECIFICATIONS | |
|---|---|
| 1. Video Input Voltage (full scale) | +/− 1 volt maximum |
| 2. Sync Pulse Input Voltage (triggered on rising edge) | 0 to 2 volts dc |
| 3. External Clock Input Voltage | 0 to 5 vdc TTL level |
| 4. BNC back panel connectors | 50 ohm termination |
| 5. Maximum sampling rate | 20 MHz |
| 6. Sampling duration | 52.4 msec at 20 MHz rate 838 msec at 1.25 MHz rate |
| 7. Duty cycle of sampling clock | 50 percent |

Note: The sampling duration given above is for the full 1 meg of memory. The actual duration depends upon the sampling rate and the mount of memory used (1 meg max).

| MAXIMUM OPERATING CONDITIONS | |
|---|---|
| 1. Maximum +5 volt current draw | ADC Board: 0.6 amps Memory Board: 0.75 amps |
| 2. Maximum −5 volt current draw | ADC Board: 0.25 amps |
| 3. Maximum Video Input Voltage | +/− 5 volts dc |
| 4. Maximum Sync Pulse Voltage | 0 to 5 volts dc |

Chapter II. FUNCTIONAL DESCRIPTIONS AND BLOCK DIAGRAM

This chapter is intended to explain how the PC2000 Digitizer works in general terms. The system is broken down into several functional blocks that perform specialized operations. The blocks are connected together through a series of data signal lines which allow each block to transmit or receive data from the other blocks. The complete digitizer system consists of all the individual blocks working together simultaneously.

Figure 2:
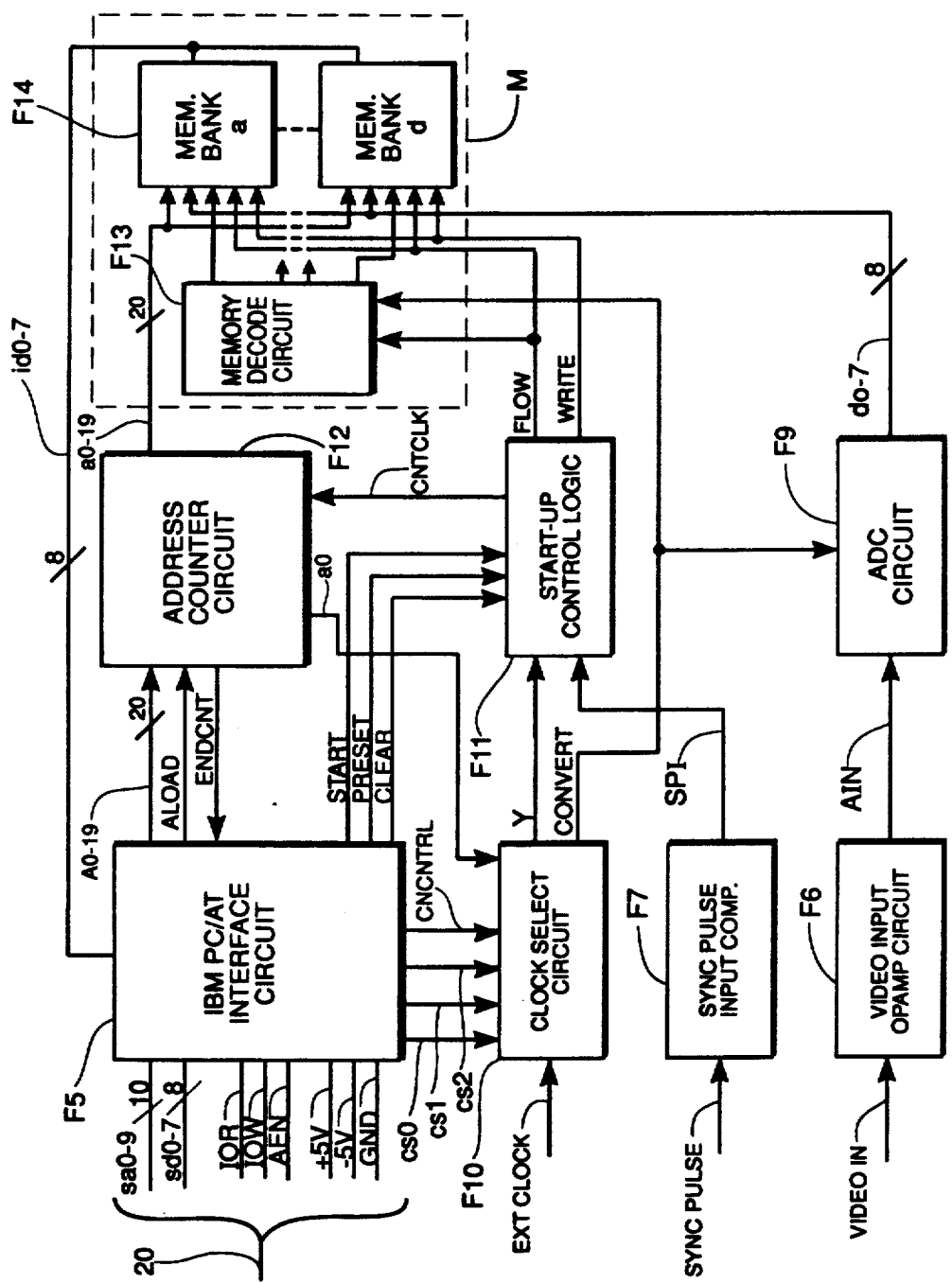
FIG. 2 is a block diagram of the digitizer.

As shown in the block diagram of the PC 2000 Digitizer in FIG. 2, there are basically eight separate functional blocks which make up the PC2000 system. Seven of these blocks located on one of the circuit boards are an IBM PC/AT Interface Circuit F5, a Clock Select Circuit F10, a Sync Pulse Input Comparator F7, a Video Input OPAMP Circuit F6, an Address Counter Circuit F12, a Start-Up Control Logic unit F11, an Analog-to-Digital Converter (ADC) Circuit F9. The eighth block located on the second circuit board is the SRAM Memory Circuit M. The memory M comprises a memory decode circuit F13, and four memory banks of which banks a and d are shown. Memory bank a is shown as circuit F14.

1. IBM PC/AT Interface Circuit F5—The function of this block is to provide communication between the host computer and the PC2000 system itself. The host computer communicates to this circuit via the standard IBM PC/AT card slot which is located inside the computer. These signal lines include ten address lines sa0-9, eight data lines sd0-7 which are used to transfer data both to and from the PC2000, and three control lines IOR, IOW, and AEN which are used to validate the communication sequences between the PC2000 and the host computer. Power for the PC2000 is also supplied through the interface slot on leads +5v, −5v and GND. OutPuts from the interface circuit F5 include twenty address lines A0-19 needed to Program the Address Counter Circuit F12, a signal on a line ALOAD which is used to control the loading sequence, three clock select lines CS0, CS1 & CS2 which are decoded to define the user selectable clock, and a signal line CKCNTRL for the software controlled clock signal. This signal is used to manually clock through the memory addresses while reading back the data. Also generated by the Interface Circuit F5 are signals on three control lines START, PRESET, AND CLEAR. These control signals are used to set the operating mode of the PC2000. Further details on these modes are included in Chapter IV part A.

Other than the IBM interface signal lines mentioned in paragraph one of this section, there are eight data return lines id0-7 and one additional signal line ENDCNT that are inputs to the Interface Circuit F5. The eight data lines come from the memory circuits F14 and are used to send data from the memory to the computer during a memory read sequence following a digitize run. The signal on line ENDCNT is generated by the Address Counter Circuit F12 and signals the computer that a digitizing run has been completed.

2. Clock Select Circuit F10—This block consists of a simple circuit which provides the function of selecting between several on-board clock frequencies, one external signal either straight in or doubled in frequency, or one software controlled clock signal from line CKCNTRL. The internal clock frequencies available are 1.25, 2.5, 5.0, 10.0, and 20.0 MHz. The external clock signal is applied via a BNC jack on the back of the card from line EXT CLOCK and is doubled in frequency by internal circuitry. Both the external clock and external clock times two can be selected by the user.

Once the desired clock signal has been selected by the user (decoded from signals on lines CS0-CS2 as mentioned above), the Clock Select Circuit F10 provides two output clocked signals which are simply the inverse of each other. The signal on line Y Provides the clock signal to the Start-Up Control Logic F11 and a signal on line CONVERT provides the clock to the ADC circuit F9 and also to the Memory Circuit F14.

3. Sync Pulse Input Comparator F7—The Sync Pulse is applied to the PC2000 from line SYNC PULSE via a BNC connector on the back of the card. This signal is used to trigger the start of a digitizing sequence and must be monitored and conditioned by the Start-Up Control Logic F11. This circuit provides these functions by simply monitoring the input for a rising edge transition which crosses the +1 volt threshold point. When this occurs, a corresponding signal is sent to the Start-Up Control Logic F11 which in turn starts the digitizer.

4. Video Input OPAMP Circuit F6—Like the Sync Pulse Comparator the input to this circuit is also provided via a BNC connector on the back of the card from line VIDEO IN. The allowable input range for the video signal is between plus or minus one volt. This range provides full scale operation of the A to D converter between the raw video signal and the signal on line AIN to the Analog-to-Digital Converter F9. It provides the proper amount of signal gain and protects the expensive ADC chip from excessive input voltage.

5. Address-Counter Circuit F12—This block consists of a 20-bit address counter which provides up to one megabyte of addressable SRAM memory. As mentioned in section 1 the counters are programmable through twenty address lines a0-19 and a signal on line ALOAD provided by the Interface Circuit F5. The actual 20-bit address bus is then routed to the memory circuits for decoding. The clock signal used to run the counters is from line CNTCLK and is generated by the Start-Up Control Logic F11. This signal originates from the signal on line Y and therefore is at the same frequency as the user selectable clock. Again, the a0 address line is fed back to the Clock Select Circuit F10 to double the external clock input signal and the signal on line ENDCNT is read by the Interface Circuit F5 to signal the end of a digitizing run.

6. Start-Up Control Logic F11—The Start-UP Control Logic is the main controller for all the required timing signals. This circuit controls which mode the system is in as well as controlling the Address Counters F12 and Memory Circuits F14. The mode of operation is controlled by signals on the START, PRESET, AND CLEAR lines which are in turn software controlled. Other inputs to this circuit include signals on the Y and SPI leads, as described above.

This circuit F11 provides the clock signal on lead CNTCLK necessary to run the Address Counter Circuit F12 and also provides two control signals to the Memory Circuit F14. These two signals on lines FLOW and WRITE, determine whether the memory will be in a read or write mode of operation. The direction of data flow within the various data busses is also determined by these signals.

7. Analog-to-Digital Conversion Circuit F9—This circuit includes a type THC1068 analog to digital converter chip, the workhorse of the PC2000 digitizer system. As shown in FIG. 2, the video input signal is received from the Video Input OPAMP Circuit F6 via line AIN, and the conversion clock signal on line CONVERT is generated by the Clock Select Circuit F10. The frequency of this clock signal is equal to the sampling rate selected by the user. Signals on the eight data lines d0-7 which represent the digital format of the analog input are then transmitted to the Memory Circuit F14 for storage;

8. SRAM Memory Circuit F14—The memory circuits comprise the largest block in the system and are made up of four identical memory banks plus some additional "glue circuitry". The data coming from the ADC Circuit F9 is interleaved into this four-way memory system so that slower less costly memory chips can be used. In this way each of the four memory banks is only required to receive data at a maximum rate of five megasamples per second instead of twenty. Details on this circuitry can be found in Chapter III section D.

As mentioned above, signals on the control lines FLOW and WRITE are generated by the Start-Up Control Logic F11 and are used to control the direction of data flow and the mode (read or write) of the memory chips respectively. The signal on the line CONVERT is used here for clocking in the data into the memory. An address on the 20-bit bus a0-19 is generated by the Address Counter Circuit F12 and is decoded in the memory circuits for each individual bank and 256K chip. During a memory readback sequence the data is transmitted from the Memory Circuit F14 to the Interface Circuit F5 via the 8-bit bus id0-7.

Chapter III. CIRCUIT DESCRIPTIONS AND ANALYSIS

Figure 5:
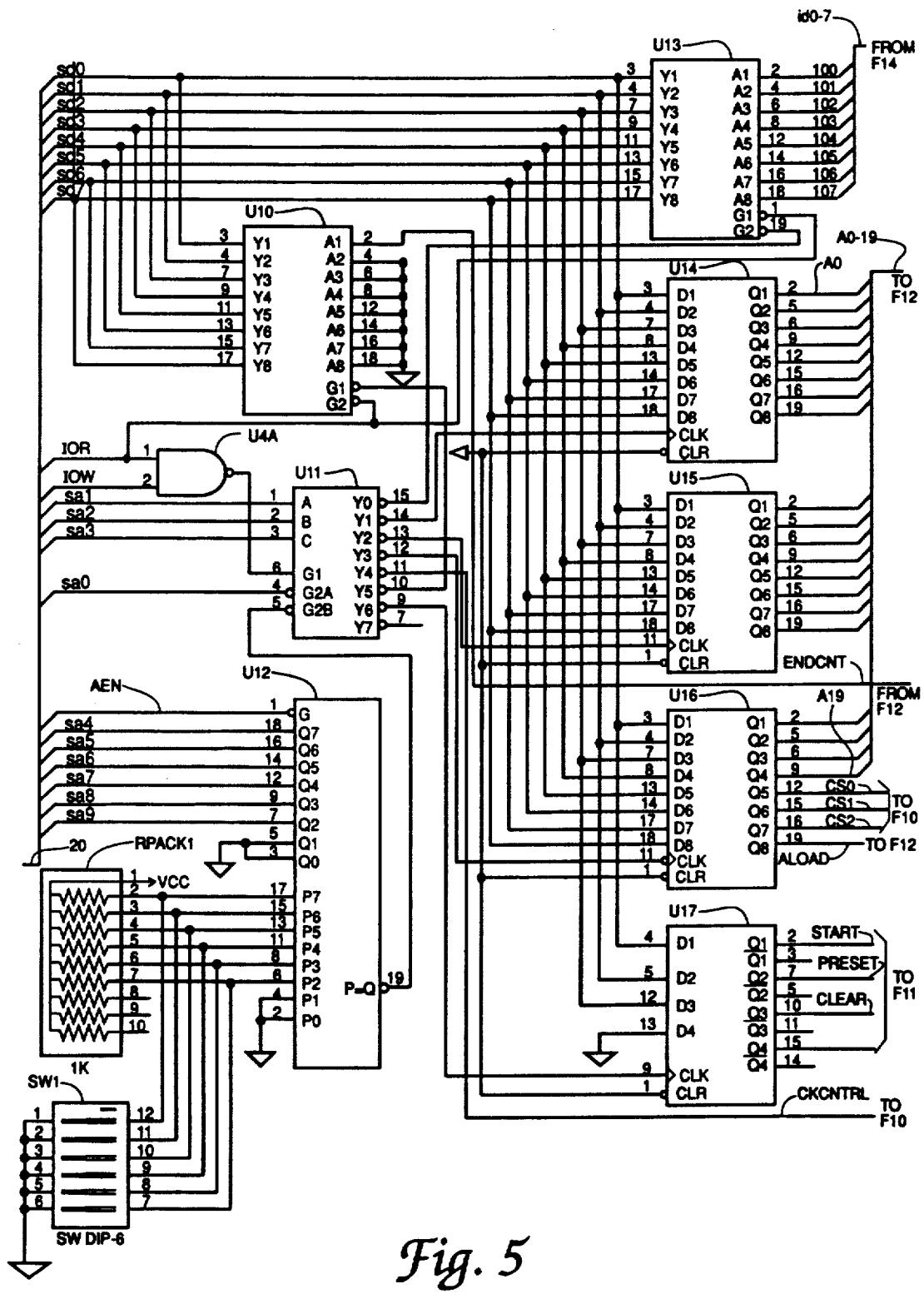
FIG. 5 is a functional block diagram of a IBM/AT interface circuit of the digitizer.

1. IBM PC/AT Interface Circuit F5—The PC2000 digitizer interface circuit F5 provides a means of communicating to the PC2000 digitizer through an IBM compatible PC/AT computer. The interface circuit is shown in FIG. 5. Inputs to the interface include data lines sd0-sd7, address lines sa0-sa9, input/output read and write lines IOR and IOW, an address enable line AEN, and the power lines. The address to the interface along with the various ports is selected through the computer address lines and is controlled by units U12, RPACK1 and SW1. Data to and from the various ports within the interface is transceived via the eight data lines sd0-sd7. Lines IOR, IOW, and AEN are used to enable the interface when communication between it and the computer occurs.

There are two octal tri-state bus drivers U10 and U13 (type 74ALS465). When both enable inputs G1 and G2 of one of these bus drivers are low, the inputs A1-8 are coupled to the respective outputs Y1-8. One of the enable inputs of each bus driver is connected to lead IOR. The other enable inputs of drivers U10 and U13 are connected to outputs Y5 and Y0 respectively of the decoder U11. When bus driver U10 is enabled, it couples the signal on line ENDCNT to line sd0; and when bus driver U13 is enabled, it couples the signals on lines id0-7 to lines sd0-7.

There are three octal D-type edge-triggered flip-flop units U14, U15 and U16 (type 74LS273); and one quad D flip-flop unit U17 (type 74LS175). These flip-flop units U14, U15, U16 and U17 are clocked respectively by signals from outputs Y0, Y2, Y3 and Y6 of the decoder U11; and each when clocked stores data from lines sd0-sd7.

The address select circuit consists of an eight-bit comparator U12 (type 74LS688), 1K pull-up resistors on unit RPACK1, and a six-element DIP switch unit SW1. In the comparator U12, the P2-7 inputs, which are selected by switches of unit SW1, must match the Q2-7 inputs, controlled by signals on address lines sa4-9 (Q0, Q1, P0 & P1 are grounded), in order for the output P=Q (pin 19) to go low. In addition to this criteria, the signal on line AEN which is connected to pin 1 of unit U12, must also be in a low state. The default base address of the interface is 300 hex. Switch settings 5 and 6 of unit SW1 are therefor set to 1, while 1-4 are set to 0. The address selected must be equal to 30 hex for the P=Q output to become active. The lowest four address lines sa0-3 are used to control a 3-to-8 decoder unit U11 (type 74LS138) which controls the various port select lines.

The interface circuit uses seven out of the available eight address ports. These ports are selected through even addresses (i.e., 300, 302, 304, etc.). The port select lines which are active low are labeled Y0 through Y6 on the decoder U11. To enable one of these lines several things must occur. First, the proper address must be selected through the software; this in turn will activate P=Q as described above and also set a signal on line IOR or IOW low depending on a read or write cycle respectively.

Figure 3:
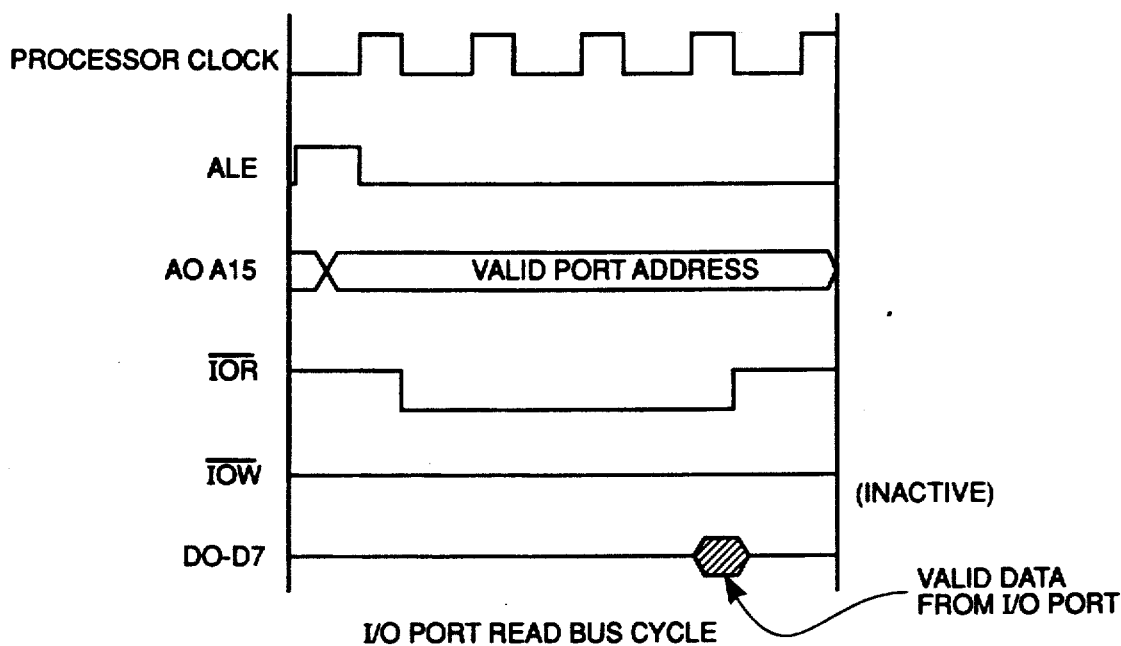
FIG. 3 is a graph of an I/0 port read bus cycle.
Figure 4:
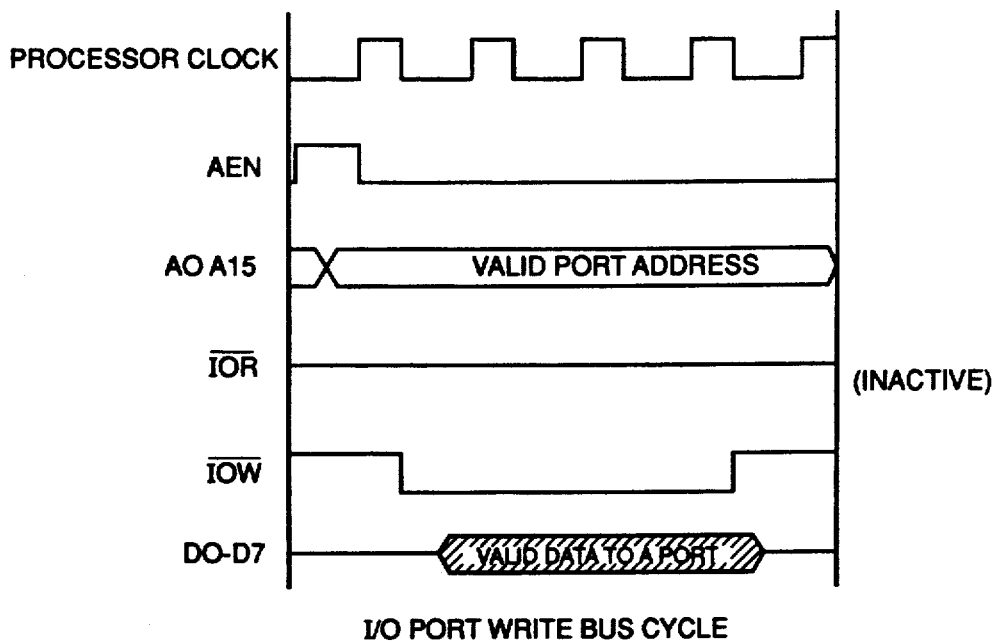
FIG. 4 is a graph of a port write bus cycle.

FIGS. 3 and 4 illustrate the timing associated with IO read and write cycles. When one of these lines goes low, the output of NAND gate U4A (type 74AS1000) goes high and enables G1 (pin 6) of decoder U11. Because only even addresses can be selected, the signal on lead sa0 must stay low in order to enable G2A (pin 4) of decoder U11. The G2B enable (pin 5) is controlled by P=Q. Because lines sa1-3 are connected to the select lines of decoder U11, the various port control lines can then be activated by accessing the respective addresses listed in Table 1. By reading or writing to these specific addresses, one can control the operation of the PC2000 digitizer. The individual functions of each of these ports will be described in further detail within the following sections.

TABLE 1

| U11 Output | IO Port Addresses. | |
|---|---|---|
| | Address | |
| Y0 | 300 | Memory read port |
| Y1 | 302 | Counter address lines 0-7 |
| Y2 | 304 | Counter address lines 8-15 |
| Y3 | 306 | Counter address lines 16-19, Clock select lines, ALOAD |
| Y4 | 308 | CKCNTRL control line |
| Y5 | 30A | ENDCNT read port |
| Y6 | 30C | START, PRESET, and CLEAR |

Figure 6:
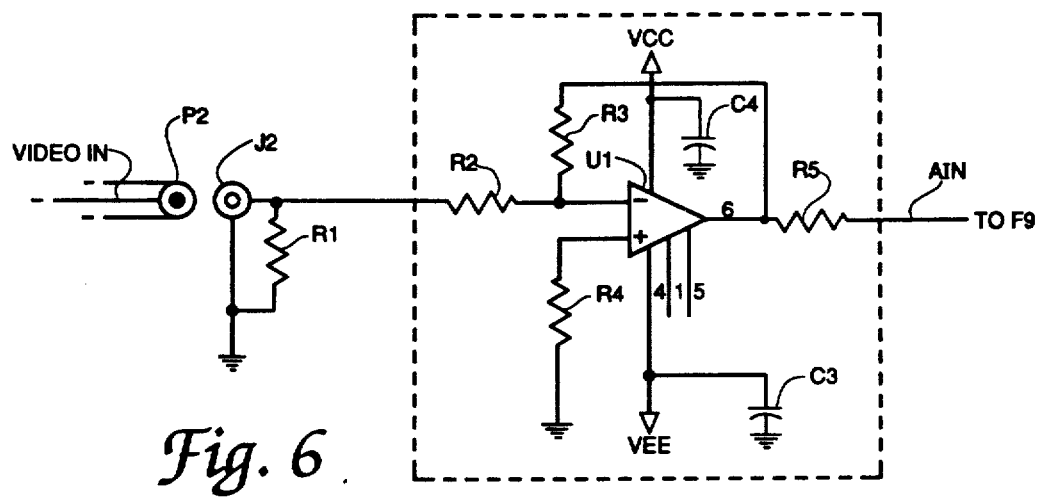
FIG. 6 is a functional block diagram of a video input circuit of the digitizer.

2. Video Input OPAMP Circuit F6—This basic op-amp circuit is shown in FIG. 6 and consists of a type EL2020 op-amp circuit U1 and several metal film resistors. The coaxial line VIDEO IN is connected via a BNC plug P2 and jack J2 to the input, with a 51-ohm resistor R1 to ground. The minus input of the op-amp at pin 2 is connected via a 1K resistor R2 to the input at jack J2. A 1K feedback resistor R3 connects pin 2 to the output pin 6. A 1K resistor R4 connects the plus input at pin 3 to ground. Tantalum 4.7 $\mu$F capacitors C3 and C4 connect pins 4 and 7 respectively to $-5$ volts at VEE and $+5$ volts at VCC. The video input signal is specified to be between plus or minus 1 volt ($+/-$ 1 volt maximum input). The gain of the circuit is equal to $-Rf/Ri$ or $-R3/R2$ which is equal to $-1.0$. The input resistance of the op-amp is 1K ohm so a 1K series resistor R5 between pin 6 and the output line AIN acts to divide the signal by 2 providing a total gain of $-\frac{1}{2}$. In other words the voltage at line AIN equals $-\frac{1}{2}$ the video input signal or one half of the inverted signal.

Figure 7:
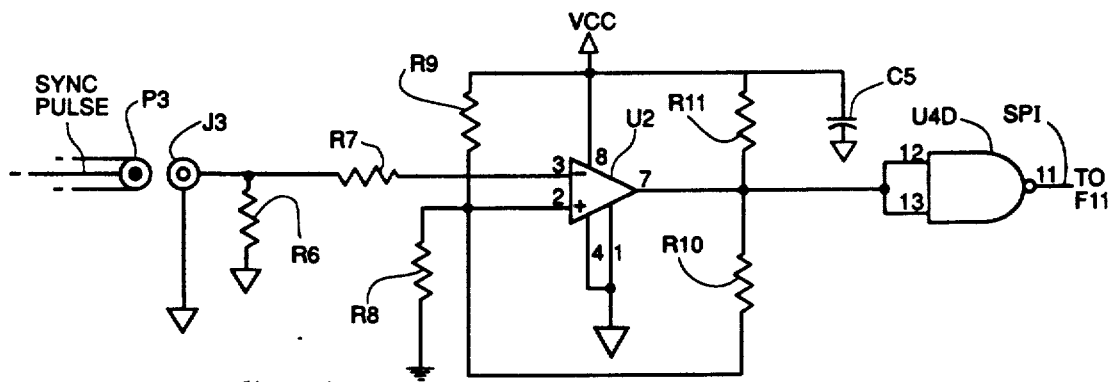
FIG. 7 functional block diagram of a sync pulse input comparator of the digitizer.

3. Sync Pulse Input Comparator F7—This circuit, shown in FIG. 7, consists of a type LM311 voltage comparator U2, assorted resistors, and a NAND gate U4D (type 74AS1000). The coaxial line SYNC PULSE is connected via a BNC plug P3 and jack J3 to the input, with a 51-ohm resistor R6 to ground. The minus input at pin 3 is connected via a 2K resistor R7 to the input at jack J3. A 1.2K resistor R8 connects the plus input at pin 2 to ground. The $+5$ volts at VCC is connected via a 4.7K resistor R9 to pin 2, via a 2K resistor R11 to pin 7, and via a 4.7 $\mu$F capacitor C5 to ground. Pins 1 & 4 are grounded. A 100K resistor R10 connects pin 2 to pin 7. The output pin 7 is coupled via the gate U4D used as an inverter to the output line SPI.

The sync pulse input signal is a trigger generated by an external source and must lie between 0 and 2 volts dc. The switching point of the comparator is designed to be approximately 1 vdc. When the voltage at the minus input (pin 3) of the comparator is less than that of the plus input (pin 2), the output (pin 7) will be high or $+5$ vdc. When the voltage at the minus input exceeds that of the plus input, the output will swing low (0 vdc).

The addition of resistor R10 provides a little hysteresis at the switching voltage. These switching voltages are calculated by first summing the currents at the plus input to the comparator.

$$\frac{V^+ - Vcc}{R9} + \frac{V^+ - Gnd}{R8} + \frac{V^+ - Vo}{R10} = 0$$

Using a little algebra and solving for $V^+$ yields:

$$V^+ = \frac{VccR_8R_{10} + VoR_8R_9}{R_8R_9 + R_8R_{10} + R_9R_{10}} = 1.0073 + Vo(0.0095)$$

(R8 = 1.2 kohm, R9 = 4.7 kohm, R10 = 100 kohm, Vcc = 5 vdc)

Figure 8:
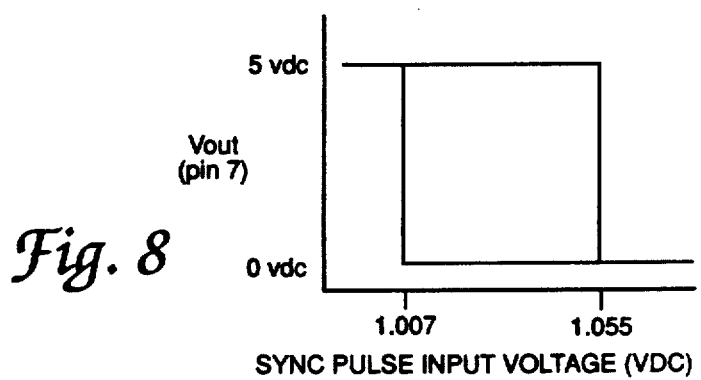
FIG. 8 is a graph of a trigger window of the comparator of FIG. 7 showing hysteresis.

With $V^-$ less than $V^+$, Vo=5 volts and $V^+$ is calculated to be 1.055 vdc. When $V^-$ exceeds $V^+$, Vo=0 volts and $V^+$ comes out to 1.007 vdc. A graph showing the comparator trigger window is shown in FIG. 8.

The NAND gate U4D is used as an inverter so that the start of a digitize sequence will be triggered on a rising edge transition of the sync pulse.

Figure 9:
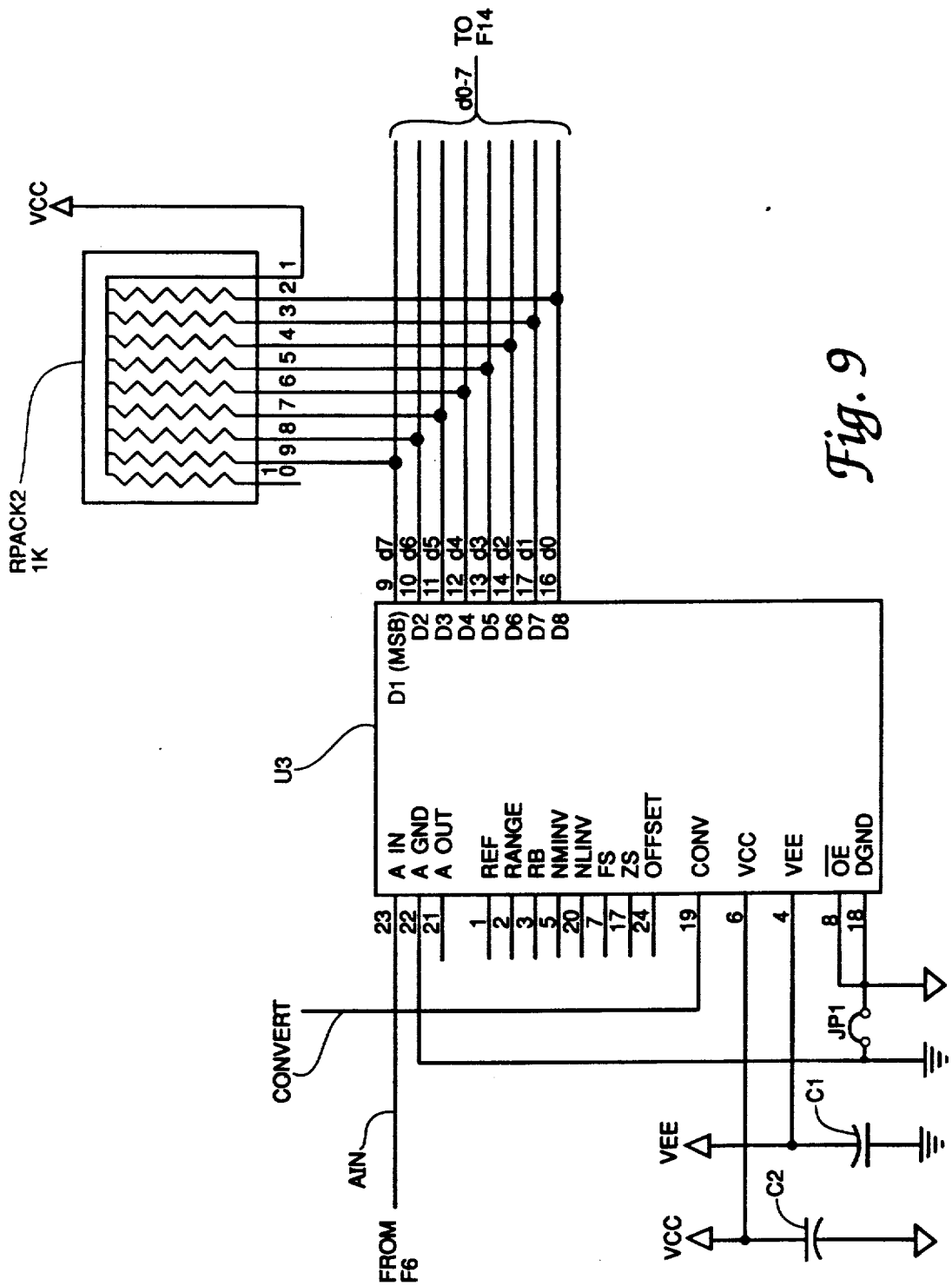
FIG. 9 is a functional block diagram of an analog to digital converter circuit digitizer.

4. Analog to Digital Converter F9—Referring to FIG. 9, the THC1068 IC is a complete flash analog-to-digital converter which combines a wideband analog input amplifier, a precision voltage reference, and three-state output drivers in one package. It provides 8 bits of resolution at a conversion rate up to 20 MHz.

Although the data outputs are TTL compatible, 1 kohm pullup resistors in a unit RPACK2 provide additional current supply when all the memory circuits are connected. The signal on line CONVERT is generated by the clock select circuit F10 and provides a clock signal to the converter F9. For specific information on the performance and timing of the converter, refer to TRW data sheets for the THC1068 unit.

Figure 10:
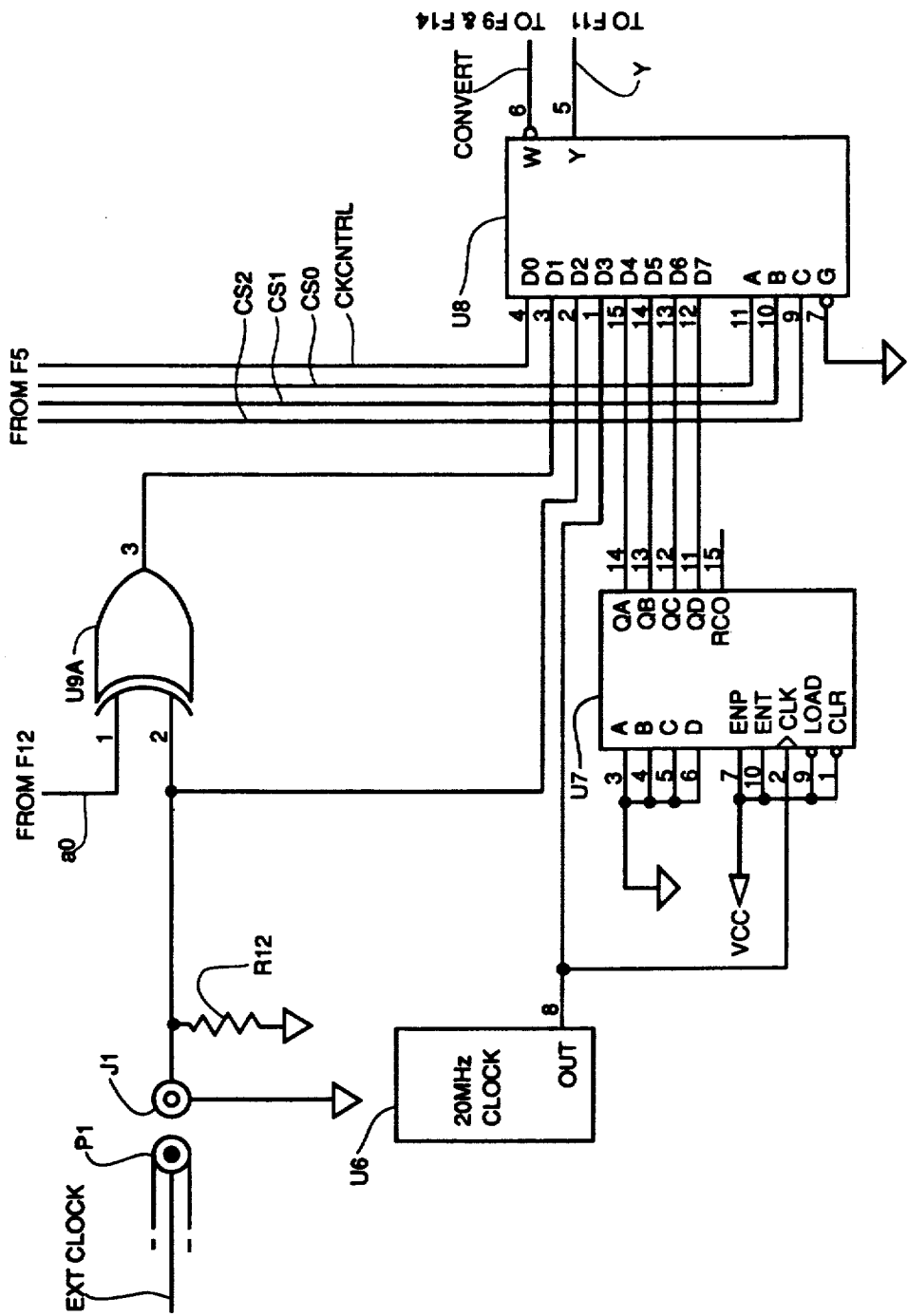
FIG. 10 is a functional block diagram of a clock select circuit of the digitizer.

5. Clock Select Circuit F10—This circuit, as shown in FIG. 10, consists of a 20 MHz TTL clock U6, a binary counter U7 (type 74AS161), and one exclusive OR gate U9A (type 74F86). Output is provided via a selector U8, (type 74F251) The coaxial line EXT CLOCK is connected via a BNC plug P1 and jack J1 to the input, with a 51-ohm resistor R12 to ground. The purpose of this circuit is to provide the user with a choice of seven different clock sources and one IBM bus controlled clock. The choice of clock signals is controlled by the clock-select lines CS0, CS1 & CS2. These three select lines are controlled by the user software and interface circuitry F5. The clock control line CKCNTRL also comes from the interface F5. An address line a0 from the address counter circuit F12 is connected to one input of the gate U9A.

The 20 MHz clock U6 is free running and continuously drives the counter U7. The four binary outputs of the counter provide divide by 2 (10 MHz), divide by 4 (5 MHz), divide by 8 (2.5 MHz), and divide by 16 (1.25 MHz) clock signals. The exclusive OR gate U9A combines the signal from the feedback address line a0 with the external signal from line EXT CLOCK. The external clock signal must be a TTL clock signal with a frequency less than 20 MHz (10 MHz is the times two feature is used). The "external clock" and "external clock time two" signal lines from the input and from the gate U9A are connected to the selector U8 along with the outputs of the counter U7 providing the five internally generated signals described above. The W and Y outputs of the selector U8 on lines CONVERT and Y are simply compliments of each other.

The inputs to the selector U8 are shown in table 2.

TABLE 2

| Data Input | Clock Select Lines | | | Selected Clock Signal |
|---|---|---|---|---|
| | CS0 | CS1 | CS2 | |
| D0 | 0 | 0 | 0 | CKCNTRL (Bus controlled) |
| D1 | 0 | 0 | 1 | Ext. Clock times two |
| D2 | 0 | 1 | 0 | Ext.clock |
| D3 | 0 | 1 | 1 | 20 MHz Internal Clock |
| D4 | 1 | 0 | 0 | 10 MHz Internal Clock |

TABLE 2-continued

| Data Input | Clock Select Lines | | | Selected Clock Signal |
|---|---|---|---|---|
| | CS0 | CS1 | CS2 | |
| D5 | 1 | 0 | 1 | 5 MHz Internal Clock |
| D6 | 1 | 1 | 0 | 2.5 MHz Internal Clock |
| D7 | 1 | 1 | 1 | 1.25 MHz Internal Clock |

6. Start-Up Control Logic F11—Referring to FIG. 11, the start-up control logic consists of two D-type flip-flops U5A and U5B (type 74F74) and one NAND gate U4C (type 74AS1000). This circuit provides control over the state of the digitizer such as initializing the system for either a digitize sequence or a memory read sequence. Inputs to the circuit include the user selected clock signal on line Y from the clock select circuit F10, the signals on lines PRESET, CLEAR and START from the interface circuit F5, and the trigger pulse on line SPI from the sync pulse input circuit F7. Outputs from the circuit include the WRITE and FLOW lines to the memory circuits F14 and the CNTCLK line to the address counter circuit F12.

The flip-flop U5A can be preset to allow bus controlled clocking of the address counters. This is required whenever a starting address is loaded into the counters or when reading data back from the memory circuits. Otherwise, during a start of a digitize, flip-flop U5A is cleared and flip-flop U5B armed with the START signal. Once this has occurred, the next rising edge of the sync pulse will trigger the flip-flop U5B and start the digitize sequence. A more in depth analysis of the circuit is described below.

The three control signals on lines PRESET, CLEAR and START control the state of the control logic circuit. These signals are software controlled and come from the interface circuitry. The key to the circuit is the NAND gate U4C which acts to gate the clock signal on and off or pass it through to the address counters via line CNTCLK. The Q output (pin 5) of flip-flop U5A is the qualifying line which allows the clock signal to pass through the NAND gate. This line can be either set high with the signal on line PRESET or set low with the signal on line CLEAR. When both the PRESET and CLEAR lines are released (set high) the output line Q will follow the data input at pin 2 upon rising edge of the clock signal at pin 3. Since this clock signal is free running, the data line at pin 2 becomes the controlling factor.

The flip-flop U5B controls the data line which feeds flip-flop U5A. This signal which is at the Q output (pin 9) of the flip-flop can be held low via a low level of the signal on line START which is also software controlled. By this means the digitizer can be disarmed and no digitize sequence can occur. When the signal on line START is released or set high the digitizer becomes armed and the next rising edge at pin 11 will cause the output Q (pin 9) to swing high. Assuming everything is set up properly, a digitize sequence will then begin. It should also be noted that once a digitize sequence begins, the signals on lines WRITE and FLOW remain constant until the sequence is completed. A timing diagram of a start sequence showing the various signals mentioned above is described in Chapter IV.

Figure 12:
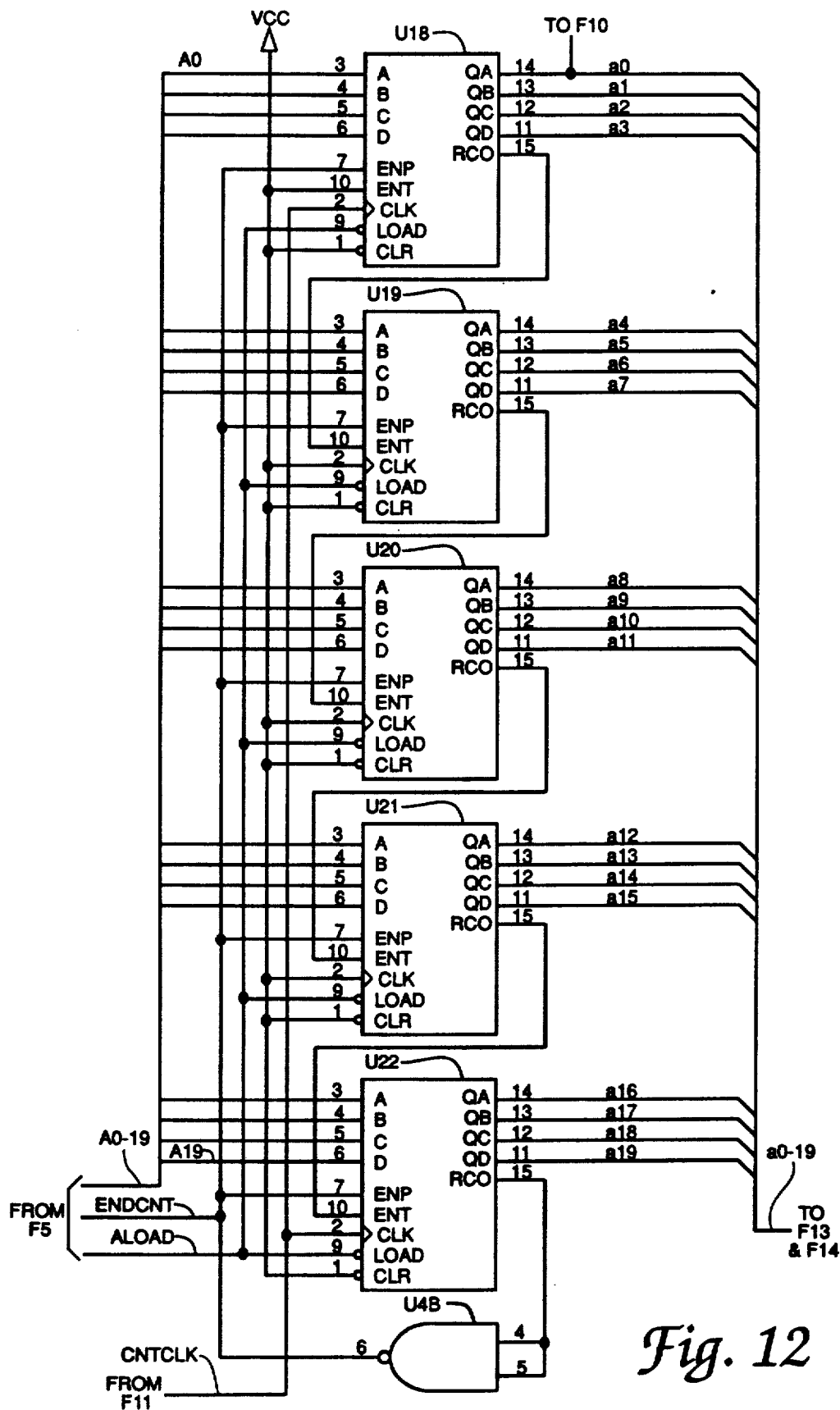
FIG. 12 a functional block diagram of an address counters circuit of the digitizer.

7. Address Counter Circuit F12—Referring to FIG. 12, the address counter circuit comprises five 4-bit binary counters U18-U22 (type 74AS161). which together provide a 20-bit address bus or 1 megabyte of addressable SRAM. The circuit also includes one NAND gate U4B (type 74AS1000) used to invert the signal to line ENDCNT. The five counters are configured in a cascade arrangement with the RCO (ripple carry out) of the lower significant chip feeding the ENT (trickle enable input) of the next higher significant chip.

The binary counters are programmable by means of the line ALOAD and the interface circuit F5. When the signal on line ALOAD is set low and a starting address is placed onto the bus A0-19, a clock pulse to pins 2 of the counters will load that address into the counters. This clock pulse is provided via the line ENDCNT when properly selected through the clock select circuit F11. Once this has been accomplished the line ALOAD can be released and counting will resume upon a clock signal at pins 2.

When all of the counter chips U18-U22 have reached full count, the RCO output of the most significant chip U22 swings high and results in a low state (inverted through gate U4B) at the ENP (parallel enable) inputs of the counters. This immediately halts the counting and results in the end of a digitize sequence. The signal on line ENDCNT is also monitored by the software and the interface circuit F5 for subsequent actions.

Figure 13:
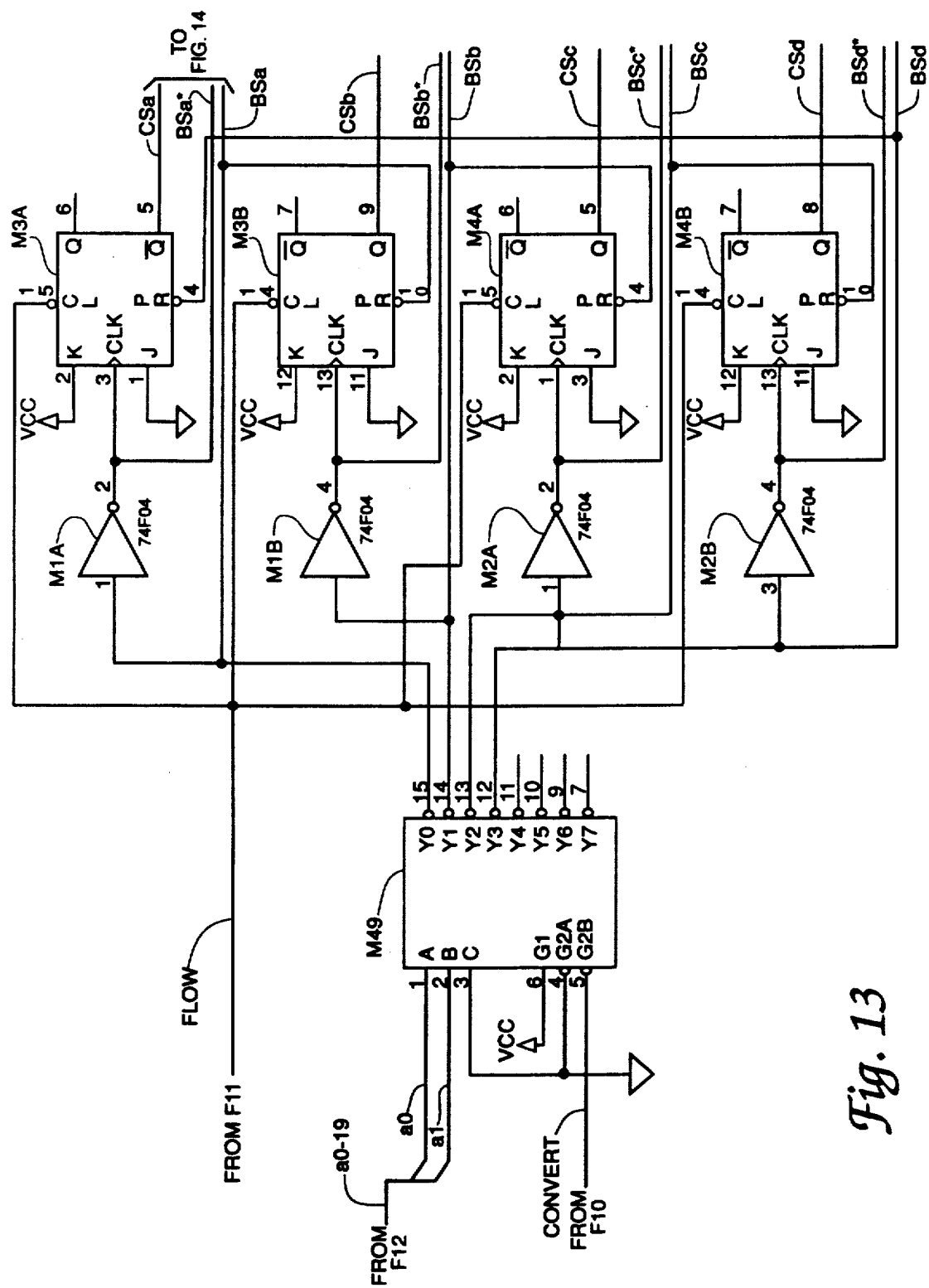
FIG. 13 is a functional block diagram of a memory decode circuit of the digitizer.

8. SRAM Memory Circuit F13 and F14—As mentioned in chapter 2, the memory circuits are made up of four identical banks which are interleaved together providing a total of 1 megabytes by 8 bits of storage capacity. By using this configuration, slower less costly static RAMs can be used instead of higher priced very high speed memory. Inputs to the memory circuits (which are contained entirely on a separate printed circuit board) include the 8-bit data bus d0-7 from the ADC circuit F9, the 20-bit address bus from the address counter circuit F12, the line CONVERT from the clock select circuit F10, and the WRITE and FLOW lines from the start-up control logic circuit F11. There is an 8-bit data bus id0-7 which connects the memory circuits to the interface circuit F5 for data retrieval purposes. FIG. 13 shows the memory decode and timing circuitry and FIG. 14 illustrates one bank of SRAM with the associated address and data buffers.

As shown in FIG. 13, the two least significant address bits on lines a0 and a1 connected to a decoder M49 (type 74AS138) are gated via a signal on line CONVERT. This scheme produces four non-overlapping successive pulses BSa-BSd which control the interleaving processes of each individual bank of memory. Some additional "glue logic" (analysis described below) such as inverters M1A, M1B, M2A and M2B (type 7404), and J-K flip-flops M3A, M3B, M4A and M4B (type 74F112) are shown in FIG. 13. The following circuit analysis will therefore focus on one bank of memory (bank a).

Figure 14:
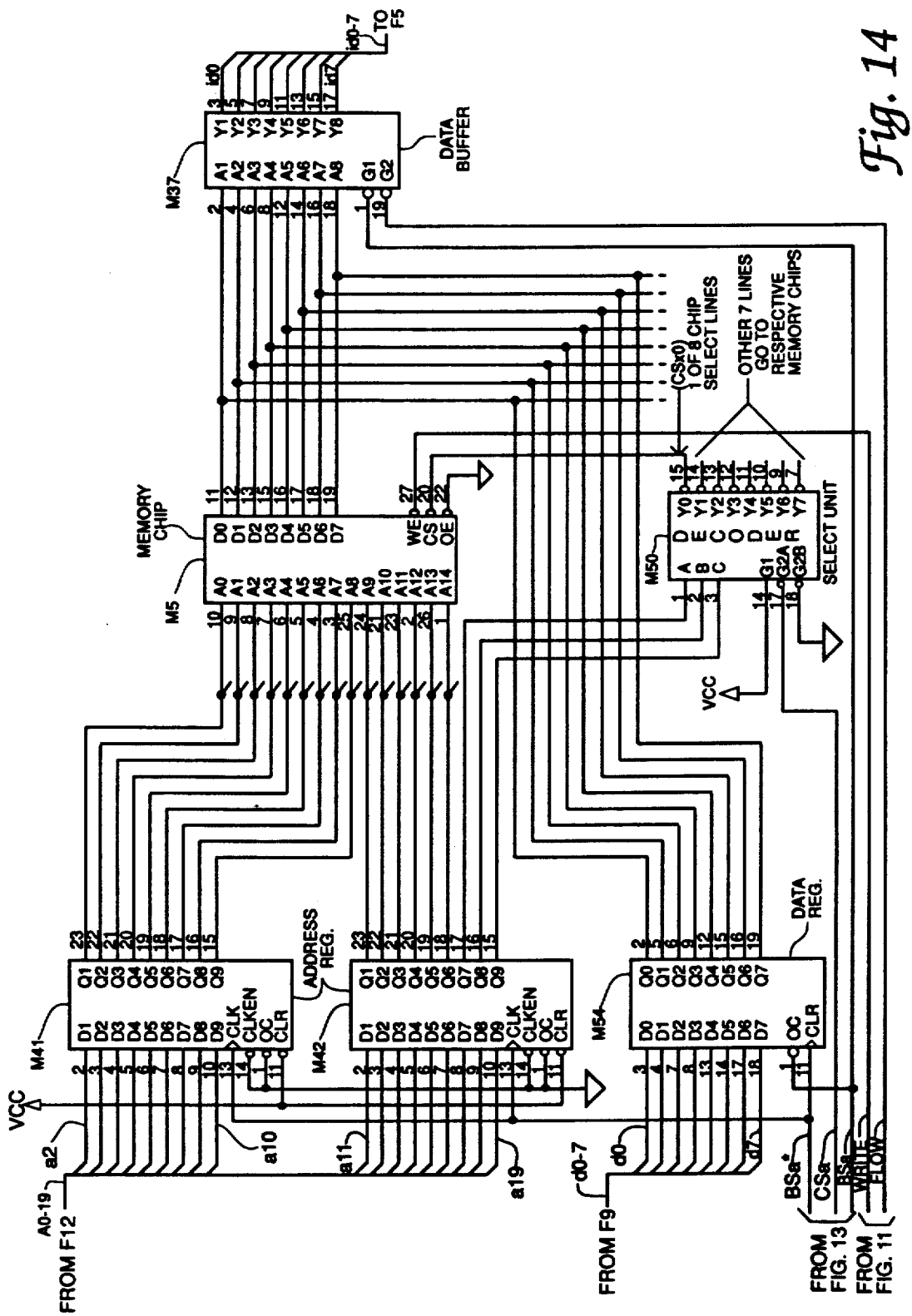

As shown in FIG. 14, the address bus A0-19 is buffered through two address register chips M41 and M42 (type 74AS823), and the data bus d0-7 is buffered through a data register chip M54 (type 74F374). The data is clocked into these registers by the rising edge of a signal on line BSa* (inverted BSa through inverter M1a) or the falling edge of the signal on line BSa. Since this pulse occurs only once every four address counts (decoded through decoder M49 in FIG. 13), each of the memory banks captures every fourth data sample in turn. Once the address and data samples are locked into the registers, a write pulse must occur at the memory chip in order for it to be stored. The scheme used here utilizes the chip select (pin 20) for the write cycle. The write enable line (pin 27) is held constant (low for write or high for read) by the signal on line WRITE generated by the start-up logic F11.

Because the memory chips are 32K × 8 bits architecture, eight chips are needed within each bank in order to provide the 256K × 8 bits storage capacity (in bank a the eight chips are M5-M12, with only chip M5 shown in FIG. 14). A decoder such as chip M50 (type 74LS138) is used within each bank as a select unit to multiplex the write pulse, or in this case the chip select pulse, to each of the eight chips at a time. The particular memory chip being used at any time is selected by decoding the three most significant address bits after they have been latched by the registers M41 & M42. The actual write pulse is then gated using the G2A (pin 4) enable input to the decoder M50.

The timing analysis and diagrams are contained in chapter 4. Basically the write pulse is gated on and off by the flip-flop M3A (for bank a). During a digitizing sequence the signal on line FLOW is held high thus allowing flip-flop M3A to operate in the normal mode. Because the J and K lines are tied to VCC and GND respectively, a falling edge one line BSa* will trigger the output Q to go low. When a rising edge occurs on line BSd (tied to the preset input), the output at Q will swing back high. As mentioned above, this pulse is used to gate the selected output of the decoder M49. The timing diagram shown in FIG. 18 clearly illustrates chip select pulse.

During a data retrieve sequence, everything works basically the same except that the signal on line WRITE is high and the signal on line FLOW is low. The high WRITE signal disables the data buffer M49 from the internal data bus and causes the memory chips M5 etc. to be in the read mode. The low signal on line FLOW clears the flip-flops M3A-M4B disabling the write pulse sequences while also enabling the data buffers M37 etc. The line BSa is tied to the G1 enable pin (pin 1) of buffer M37, with corresponding connections in the other banks, so that only one of the four will be active on the id0-7 data bus at a time. Information can then be read back from memory locations one bank at a time using the 4-way interleaving technique. The timing associated with this sequence will be explained in chapter 4.

Chapter IV. TIMING ANALYSIS

Figure 15:
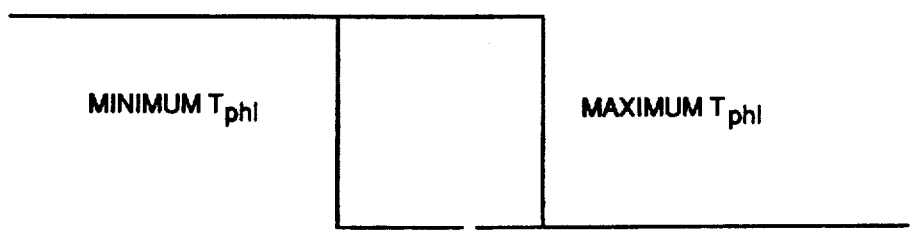
FIG. 15 a functional block diagram of a SRAM memory circuit of the digitizer.

This chapter analyzes the timing of the various signals in great detail. Minimum and maximum propagation delays down to 0.1 nanoseconds are included in this analysis. Circuit analysis is not included in this chapter except for clarity where needed. All timing calculations are referenced to the clock signal selected at the inputs of the data selector U8 of the clock select circuit in FIG. 10. One note on nomenclature is as follows: the expression (x→y) refers to (minimum and maximum) propagation delays of a particular signal, e.g. x=minimum delay and y=maximum delay. All calculations are also done in nanoseconds. The timing diagrams will reflect these "windows" of edge transition through rising and falling edges which are box shaped in appearance. FIG. 15 illustrates this concept.

The term $T_{phl}$ refers to the propagation delay for the output of a gate to transition from a high state to a low state. $T_{plh}$ refers to a low to high transition. Propagation delays for the individual chips were obtained from standard data books and are annotated in the individual calculations but are not listed separately.

A. START UP SEQUENCE

There are several steps which must take place to correctly initialize and begin a digitizing sequence. The four main controlling signals are the START, PRESET, CLEAR, and Sync pulse input. The START, PRESET, and CLEAR signals are software controlled and determine which mode the digitizer is in. The Sync pulse input will trigger the start of a digitize sequence given the proper mode. There are four defined modes which are described in further detail below.

Figure 11:
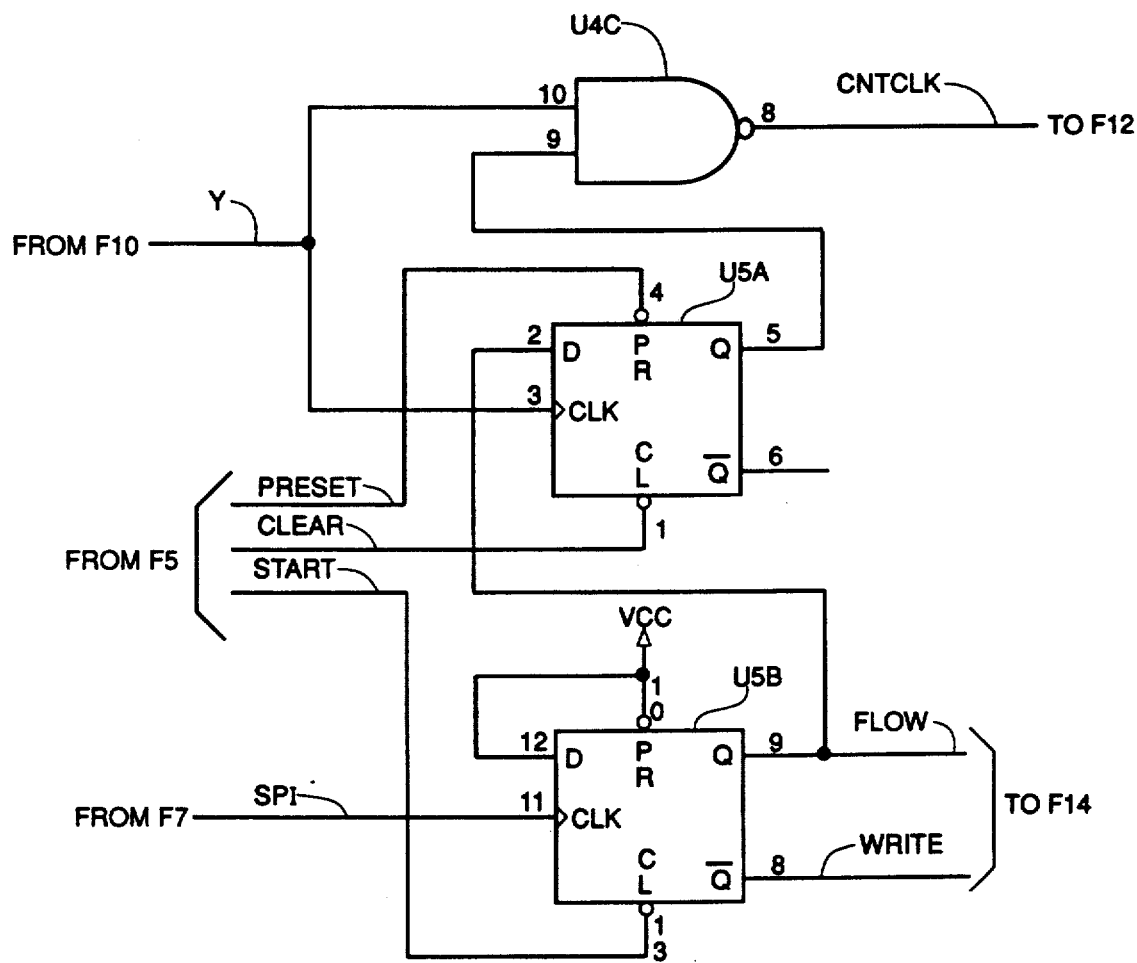
FIG. 11 is a functional block diagram of start-up control logic of the digitizer.
Figure 16:
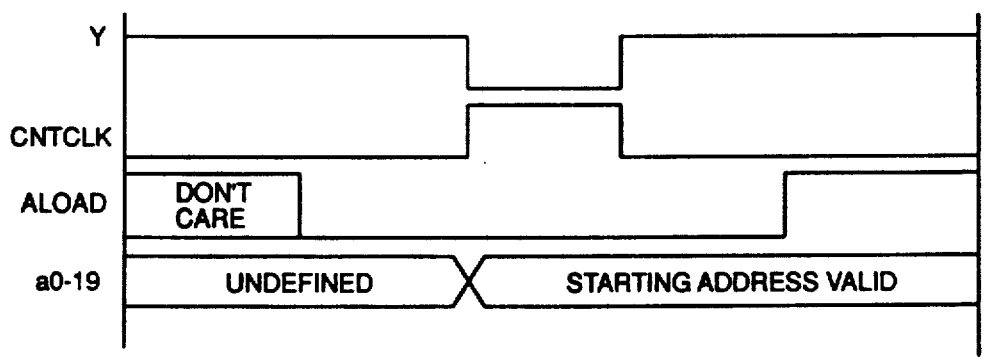
FIG. 16 is a graph showing load start-address time sequence.

The first step or mode 1 involves initializing the flip-flops U5A and U5B in the start-up control logic circuit of FIG. 11 and also setting the starting address on the counters. The START and PRESET lines are both set low while the CLEAR line is set high (port 30C hex=4). This will "clear" flip-flop U5B and "set" flip-flop U5A allowing the passage of a clock signal through the gate U4C to the counters of FIG. 12. The starting address is then loaded into the register U14 (port 302 hex), U15 (port 304 hex), and U16 (port 306 hex). At this time the clock select lines CS0-2 will be low selecting the bus controlled CKCNTRL clock (port 308 hex) and the ALOAD line will also be low. A software generated pulse on the CKCNTRL port will then clock the starting address into the counters U18-U22. FIG. 16 illustrates the timing associated with setting the starting address.

Figure 17:
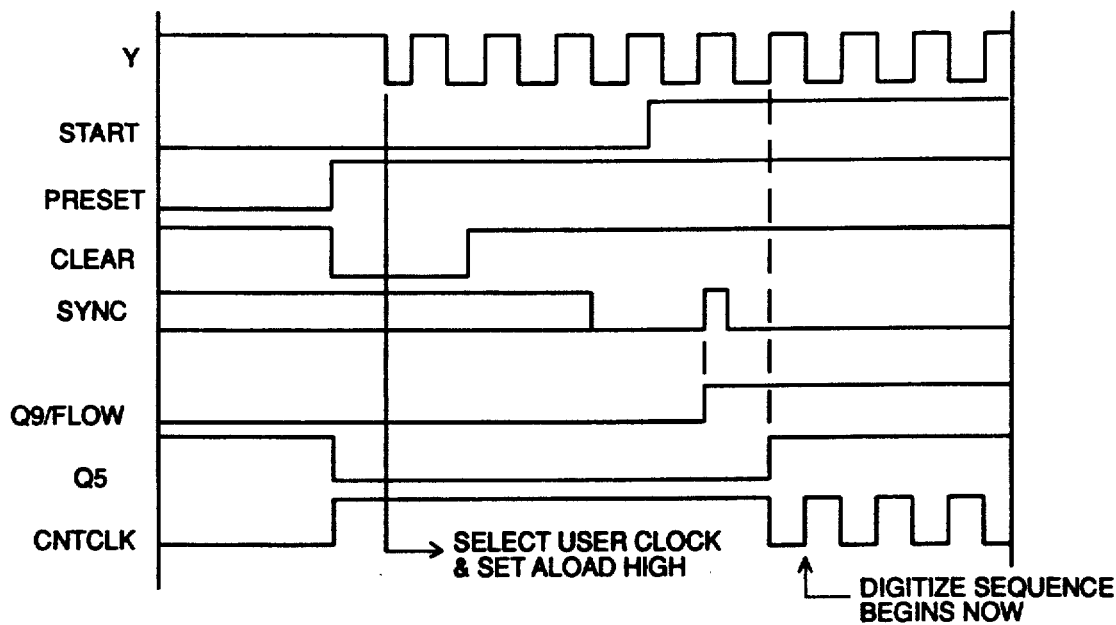
FIG. 17 is a graph showing start-up timing sequence.

The second mode occurs when the CLEAR line is set low and the PRESET line set high (port 30C hex=2). This action clears the Q output of flip-flop U5A thus disabling the NAND gate U4C. At this time the desired clock signal can be selected via the control lines CS0-2 and the software. The ALOAD line is also set high at this time. The interface port 306 hex controls both of these functions. FIG. 17 illustrates the start-up timing sequence and points out where this action is taken.

Once mode 2 has been accomplished the digitizer will be fully initialized and ready to go. Mode three allows an intermediate step for the operator to double check the hardware and signal setup. This state is referred to as the arming state and is defined by setting the CLEAR line high. This will release or arm the flip-flop U5A and allow the output Q to follow the data input. Refer to chapter III for further details on circuit analysis.

When ready to continue, the operator will initiate a digitizing run by pressing a key on the controlling computer. At this time the software will set the START line high and release the flip-flop U5B; this is called mode 4. The arrival of the next pulse (rising edge) will trigger and set flip-flop U5A. The Q output will swing high at the next trailing edge of the clock signal at flip-flop U5A pin 3. A high at the Q output will then enable the NAND gate U4C and allow the passage of the selected clock signal to the counters thus beginning a digitizing run.

B. DIGITIZING SEQUENCE

This analysis pertains to the timing during a digitizing sequence excluding the variations which occur at the start and end of a full digitize run. All calculations will be referenced to the 20 MHz clock since this is the speed at which the propagation delays are most critical. Each individual signal will be analyzed separately below and then illustrated on the timing diagram in FIG. 18.

1. Y—The Y signal is the output from the clock select chip U8 of FIG. 10.

$$T_{p1h} = T_{p1h}(U8) = \underline{4.0 \to 10.5}$$

$$T_{ph1} = T_{ph1}(U8) = \underline{3.0 \to 7.5}$$

2. CONVERT W—The CONVERT signal is the output W from the clock select chip U8 and is simply the compliment of the Y signal.

$$T_{p1h} = T_{p1h}(U8) = \underline{3.0 \to 7.0}$$

$$T_{ph1} = T_{ph1}(U8) = \underline{1.5 \to 5.0}$$

3. Address lines a0-19—The address lines are triggered off on a rising edge transition at the clock input (pins 2) of the counters U18–U22 of FIG. 12. This rising edge is provided by a falling edge of the Y signal which is inverted through the NAND gate U4C (FIG. 11).

$$\begin{aligned} T_{pxx} &= T_{p1h}(U4C) + T_{pxx}(U18-U22) \\ &= (3.0 \to 7.50) + (1.0 \to 3.5) + (5.0 \to 6.0) \\ &= \underline{9.0 \to 17.0} \end{aligned}$$

4. Data lines d0-7—The data lines are generated by the A/D converter U3 of FIG. 9 and are specified to be valid a maximum of 20 ns and no sooner than 5 ns after the rising edge of the convert signal. The data sample valid is actually a result of the clock edge two periods previously. For more information on the timing see the TRW THC1068 data sheets.

$$\begin{aligned} T_{pxx} &= T_{p1h}(\text{CONVERT}) + T_{pxx}(\text{THC1068}) \\ &= (3.0 \to 7.0) + (5.0 \to 20.0) \\ &= \underline{8.0 \to 27.5} \end{aligned}$$

5. Bank Select lines BS0-3—These signals are decoded via the a0 and a1 address lines and are gated on and off by the CONVERT signal. The decoder chip M41 etc. of FIG. 14 performs this function. Since the low state of the CONVERT signal falls within the valid address time, it becomes the qualifying signal for the bank select lines.

$$\begin{aligned} T_{ph1} &= T_{ph1}(\text{CONVERT}) + T_{ph1}(\text{M41, etc.}) \\ &= (1.5 \to 5.0) + (5.5 \text{ typical}) \\ &= \underline{8.0 \to 27.5} \end{aligned}$$

$$\begin{aligned} T_{p1h} &= T_{p1h}(\text{CONVERT}) + T_{p1h}(\text{M41, etc.}) \\ &= (3.0 \to 7.0) + (5.8 \text{ typical}) \\ &= \underline{8.8 \to 12.8} \end{aligned}$$

6. Individual Memory Bank Internal Address and Data lines—These signals are clocked through the latches M41, M42 and M54 (FIG. 14) synchronously via a rising edge at the clock input to these chips. This rising edge is generated through the inversion of the appropriate bank select line.

$$\begin{aligned} T_{pxx} &= T_{ph1}(\text{BSx}) + T_{p1h}(\text{M3A etc.}) + T_{pxx}(\text{M41 etc.}) \\ &= (7.0 \to 10.5) + (2.4 \to 6.0) + (4.0 \to 10.0) \\ &= \underline{13.4 \to 26.5} \end{aligned}$$

7. Chip Select lines—The chip select lines are selected by the decoder located in each of the four memory banks, such as decoder M50 in bank a of FIG. 14. The three most significant address liens are used to select one of the eight SRAM chips per bank of memory. The actual write pulse generated for the SRAM chips is gated by the enable pin 4 of the decoders such as M50. The JK flip-flops of FIG. 13 are configured to toggle this gate pulse on and off in the following manner: a falling edge on line BSa* will clear the output of bank a flip-flop M3A while a low level on the line BSd will set the output high. In this manner a write pulse can be generated well within the time constraints of address and data transmissions.

$$\begin{aligned} T_{ph1} &= T_{p1h}(\text{BSa}) + T_{ph1}(\text{M1A}) + T_{ph1}(\text{M3A}) + T_{ph1}(\text{M50}) \\ &= (8.8 \to 12.8) + (1.5 \to 5.3) + (2.0 \to 7.5) + (5.5 \text{ typ.}) \\ &= \underline{17.8 \to 31.1} \end{aligned}$$

$$\begin{aligned} T_{p1h} &= T_{ph1}(\text{BSa}) + T_{p1h}(\text{M3A}) + T_{p1h}(\text{M50}) \\ &= (7.0 \to 10.5) + (2.0 \to 7.5) + (5.8 \text{ typ.}) \\ &= \underline{14.8 \to 23.8} \end{aligned}$$

Figure 18:
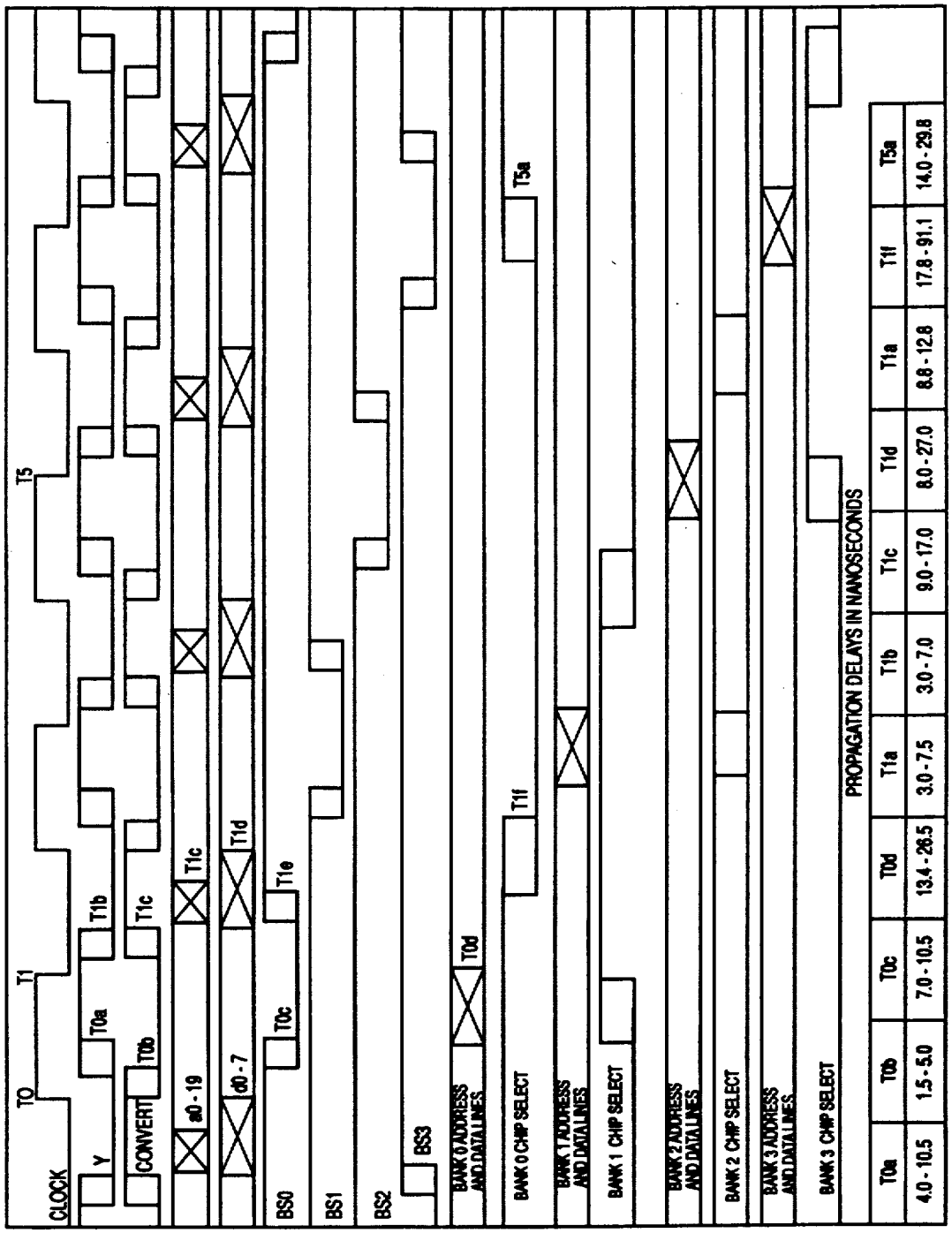
FIG. 18 is timing diagram for a digitizing sequence.

The propagation delays calculated above are all included in FIG. 18 and are annotated at the bottom of the figure. The timing signals were drawn on a computer to a tolerance of 0.15 nanoseconds. This resulted in a timing diagram which illustrates a very accurate representation of where the edge transitions actually take place. There are two timing reference marks T0 and T1 which correspond to the rising and falling edges of the clock signal respectively. All other signal transitions are referenced to one of these two marks (whichever clock edge generates the signal transition in question). For example T0a, T0b, T0c, and T0d are referenced to T0 because they are generated be a rising edge of the clock signal. The timing reference T5 occurs at the third falling edge after T0 and is used to generate the rising edge transition T5a on the bank 0 chip select line.

C. MEMORY READ SEQUENCE

Figure 19:
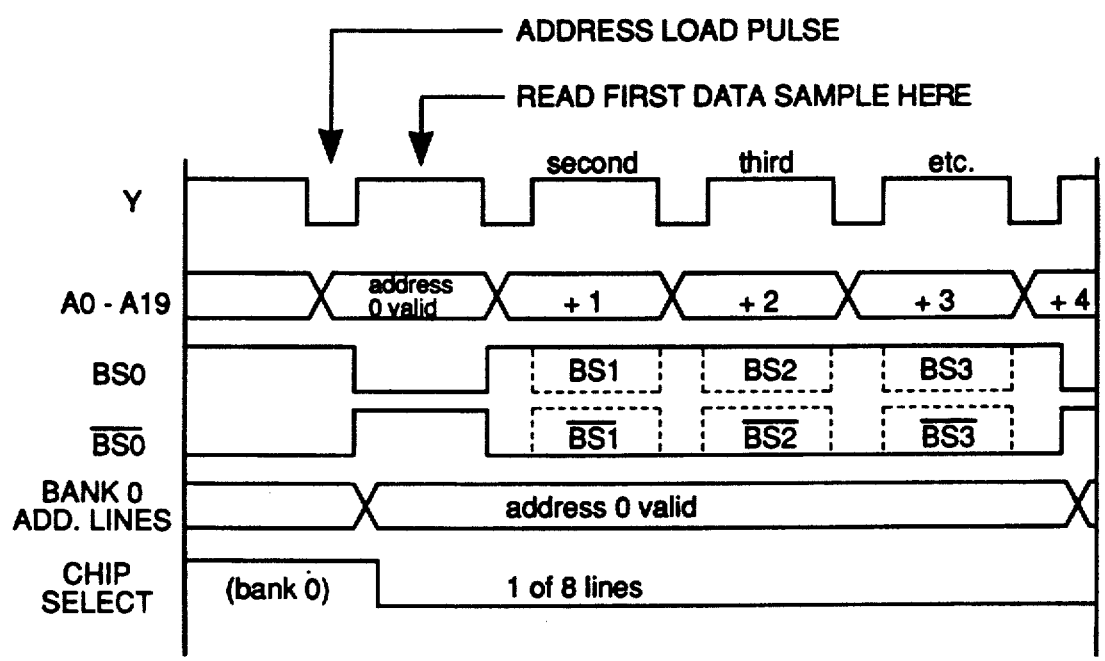
FIG. 19 is a memory read sequence timing diagram.

FIG. 19 illustrates the timing associated with the read sequence. As with the digitizing sequence the system must be properly initialized in order to properly read data back from the memory. There are four basic steps to retrieving the data from the memory: initialize the digitizer, load the starting address, read the data from the memory, and them increment the address counters. The last two steps are repeated until the final address location has been reached.

The first two steps are identical to those of the digitize sequence described in section A. In summary, the control port is configured with the command port 30CH=4 and then the starting address is loaded into the counters. Refer to section A for more details on these two procedures. The only difference here is that the clock select lines CS0-2 remain in the low state which then selects the bus controlled clock signal on line CKCNTRL. This will allow the software to increment the address as the data is being read back from the memory. With port 30C equal to 4, the START and PRESET lines are both low and the CLEAR line is high. This mode (referred to as mode 1 in the previous section) will set the WRITE line (pin 8 of flip-flop U5B, FIG. 11) high thus enabling data to be read back from the memory chips.

Once these initial procedures are accomplished, data can be directly read from the memory through port 300 hex. After the data is read and stored, the address counters can be incremented by clocking the CKCNTRL port 308 hex. These two steps are then repeated until the last memory location has been reached.

The Bank Select, Inverted Bank Select, and Chip Select lines from bank 0 are demonstrated in FIG. 19 while the bank 1, 2, and 3 select lines are shown in dotted lines at their appropriate locations in time. The signals on the address lines a0-a19 are generated from the falling edge of the signal on line Y while the individual bank address lines are validated by the rising edge of the corresponding inverted bank select line. Since the FLOW signal line is continuously held low throughout the read sequence, the chip select IC M50 (FIG. 14) is free running and controlled by the three most significant bank address lines. Thus 1 of 8 chip select lines is always active (low) within each of the four banks. As annotated in FIG. 19 the data is read from port 300H after each clock pulse on the signal line Y. As mentioned above, these pulses are generated by the software through port 308H.

Chapter V. DRIVER SOFTWARE

The driver example shown in this chapter was developed for testing and evaluating the prototype digitizers. The language is Borland Turbo Pascal because of its speed and support of Hercules Graphics which is utilized by the HP Vectra computers. Future software will be written which will include much more graphical and analysis capabilities. This program serves as an example of how to properly set up, communicate, and run the PC2000 digitizer.

Most of the program is well documented and is used to communicate information to and from the user. The function Screen and procedures GetInputs, Abort, and the main program portion are all used for this purpose. The procedures GetData and Start are the key procedures for getting data from and setting up the digitizer respectively. The procedure Graphit is what puts the retrieved data onto the screen for a quick look at the digitizing results.

Chapter IV describes the interface procedures in sections A (start up sequence) and C (memory rear sequence). The two procedures Start and GetData implement these sequences respectively.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

B. TURBO PASCAL EXAMPLE OF DIGITIZER SOFTWARE

```
Program digitizer;

($I typedef.sys)
($I graphix.sys)
($I kernel.sys)

type testdata = record dat: integer; end;

var r,c,n,lowadd,medadd,hiadd,flag,
    clk: integer; address: real;
    ch: char; done: boolean;
    flnm: string[20];
    filvar: file of testdata; datrec: testdata;

const fld: array[1..3,1..3] of integer=
    ((8,16,20),(16,62,62),(19,31,50));

{------------------------Procedures and Functions------------------------}

PROCEDURE LOADADD;

{ This procedure loads the three address buffers with
  the starting address for the digitizer. }

BEGIN
    port[$302]:=lowadd;
    port[$304]:=medadd;
    port[$306]:=hiadd;
    port[$308]:=1;          { clock the data into the buffers now }
END;
{------------------------------------------------------------------------}
```

```
FUNCTION SCREEN(R,C : INTEGER): CHAR;

{  This funcion returns the character located at the
   screen location R(row) and C(column).  }

BEGIN
   SCREEN:=CHR(MEM[$B000:(160*(R-1)+2*(C-1))]);
END;
{----------------------------------------------------------------}
PROCEDURE GETINPUTS;

{  This procedure retrieves the users inputs from the
   screen.  User selectable inputs include the starting
   address, the file name for data storage, and the
   sampling rate for digitizing.  }

BEGIN
   val('$'+screen(8,19)+screen(8,20),lowadd,flag);
   val('$'+screen(8,17)+screen(8,18),medadd,flag);
   val('$'+screen(8,16),hiadd,flag);
   val(screen(16,62),clk,flag);
   address:=lowadd+256.0*medadd+65536.0*hiadd;
   flnm:='';
   for c:=31 to 50 do begin
      flnm:=flnm+screen(19,c);
   end;
END;
{----------------------------------------------------------------}
PROCEDURE GRAPHIT;  label nextscreen;

{  This procedure performs all the graphics displays
   for the data once a digitizing sequence has been
   completed.  }

BEGIN
   initgraphic;                          { initialize graphics }
   definewindow(1,1,45,79,300);          { define a window }
   defineworld(1,1,0,632,255);           { define coordinates }
   selectworld(1); selectwindow(1);
   assign(filvar,flnm); reset(filvar);   { open the data file 'flnm' }
 nextscreen:
   clearscreen; drawborder;
{  drawline(1,127,632,127); }
   with datrec do begin
      n:=1;
      repeat
         read(filvar,datrec);            { read the data from the file }
         drawpoint(n,dat); n:=n+1;       { draw the data point on the graph }
      until n=633;
   end;
   repeat until keypressed;              { wait for user keystroke }
   read(kbd,ch);
   if ord(ch)<>27 then goto nextscreen;  (if not ESC, graph another screen)
   close(filvar);                        { close the file }
   leavegraphic;                         { go back to normal screen mode }
END;
{----------------------------------------------------------------}
```

```
PROCEDURE GETDATA;

{ This procedure retrieves the data from the PC2000
  Digitizer memory after the sequence has been
  completed.  The data is stored in the file identified
  by the user as 'flnm'. }

BEGIN
    port[$30C]:=4;                                  { reset digitizer }
    loadadd;                                        { load the starting address }
    port[$306]:=hiadd+$80;                          { set the ALOAD bit high }
    assign(filvar,flnm); rewrite(filvar);           { open the data file 'flnm' }
    with datrec do begin
       repeat
          dat:=port[$300];                          { read the memory location }
          write(filvar,datrec);                     { write the data to the file }
          port[$308]:=1;                            { increment the address counters }
          address:=address+1.0;                     { increment the loop counter }
       until address>1048575.0;                     { check for end of memory }
    end;
    close(filvar);                                  { close the file 'flnm' }
    sound(1000); delay(200); nosound;
    gotoxy(18,21); write('     - - - DATA STORAGE COMPLETE - - -        ');
    graphit;                                        { go graph the data now }
END;
{---------------------------------------------------------------}
PROCEDURE ABORT;

{ This short procedure is a fail safe way to
  abort the program at any time.  It is initiated
  by pressing the F10 key. }

BEGIN
    clrscr;
    done:=true;
    sound(800); delay(100); nosound;
END;
{---------------------------------------------------------------}
PROCEDURE START;

{ This procedure initializes the PC2000 digitizer.
  It sets up all the operating parameters called
  for by the user and returned by the GETINPUTS
  procedure. }

BEGIN
    getinputs;                                      { get the user inputs }
    port[$30C]:=4;                                  { reset digitizer (mode 1) }
    loadadd;                                        { load the starting address }
    port[$30C]:=2;                                  { preset digitizer (mode 2) }
    port[$306]:=hiadd+16*clk+128;                   { select user clock }
    port[$30C]:=6;                                  { arm digitizer (mode 3) }
    textbackground(7); textcolor(16);
    gotoxy(18,21); write('DIGITIZER ARMED (press any key to continue');
    repeat until keypressed;                        { wait for user to hit a key }
    gotoxy(18,21); write('       - - - PLEASE STAND BY - - -          ');
```

```
   port[$30C]:=7;                              ( start digitizer (mode 4) )
   repeat flag:=port[$30A]; until flag=0;  ( check for ENDCNT signal )
   gotoxy(18,21); write('- -DIGITIZE COMPLETE, RETRIEVING DATA NOW - -');
   getdata;                                    ( retrieve data from memory )
END;
{————————————————BEGIN MAIN PROGRAM NOW————————————————}
BEGIN {  Begin by setting up the graphics on the screen for
   the user to select the operating conditions for the
   PC2000 Digitizer. } textbackground(7); textcolor(0); clrscr;
   gotoxy(30,24); write('FUNCTION KEYS');
   gotoxy(24,3); write('PC DIGITIZER DRIVER PROGRAM');
   gotoxy(18,25); write('1-START    10-ABORT');
   gotoxy(10,6); write('STARTING ADDRESS');
   gotoxy(10,7); write('————————————');
   gotoxy(14,8); write('&H');
   gotoxy(45,6); write('USER SELECTABLE CLOCKS');
   gotoxy(45,7); write('————————————————');
   gotoxy(45,8); write('1 - EXT. CLOCK TIMES 2');
   gotoxy(45,9); write('2 - EXT. CLOCK');
   gotoxy(45,10); write('3 - 20 MEGAHERTZ');
   gotoxy(45,11); write('4 - 10 MEGAHERTZ');
   gotoxy(45,12); write('5 - 5 MEGAHERTZ');
   gotoxy(45,13); write('6 - 2.5 MEGAHERTZ');
   gotoxy(45,14); write('7 - 1.25 MEGAHERTZ');
   gotoxy(45,16); write('YOUR SELECTION : ');
   gotoxy(10,19); write('FILE NAME FOR DATA : ');
   textbackground(0); textcolor(7);
   gotoxy(16,8); write('F8000');                        ( default setting )
   gotoxy(62,16); write('3');                           ( default setting )
   gotoxy(31,19); write('C:\DATA\TEST.DAT   ');         ( default setting )
   N:=1; R:=8; C:=16; done:=false;

{  This last section is simply a screen editor used to
   control the keyboard and screen display while the user
   is selecting operating parameters and running the program. } while not done do begin
      flag:=0;
      gotoxy(c,r);
      repeat until keypressed;
      read(kbd,ch);
      case ord(ch) of
         13: begin
               if n=3 then n:=0;
               n:=n+1;
               r:=fld[n,1]; c:=fld[n,2];
             end;
         27: begin
               if keypressed then read(kbd,ch);
               case ord(ch) of
                  59: start;
                  68: abort;
```

```
                else
              end;
            end;
        else begin
            if n<>3 then begin
                if ord(ch) in [48..57,65..70] then begin
                    if n=2 then begin
                        if ord(ch) in [0..48,56..127] then begin
                            sound(1000); delay(100); nosound;
                            flag:=1;
                        end;
                    end;
                end
                else begin
                    sound(1000); delay(100); nosound;
                    flag:=1;
                end;
            end;
            if flag=0 then begin
                if c<fld[n,3] then c:=c+1;
                write(ch);
            end;
         end;
      end;
   end;
END.
```

What is claimed is:

1. A digitizer for converting analog signals from a video unit to digital data for analysis using a computer, wherein the digitizer comprises:

an interface circuit coupled to the computer via interface data lines, interface address lines and interface control lines, for supplying commands from the computer to the digitizer;

a flash analog-to-digital converter having an analog input coupled to a video output of the video unit, for digitizing analog data signals from the video unit to produce a sequence of N-bit data words at a digital output line;

address counter means providing an address output having M bits, comprising X low order bits and (M-X) remaining bits;

a memory comprising memory devices organized into a plurality of banks, each of said plurality of banks having address register means (M41-M42) with inputs coupled to the address output for said (M-X) remaining bits, and data register means (M54) having inputs coupled to the digital output line form the analog-to-digital converter;

a memory decode circuit having inputs for the X low order bits form the address output, and means for decoding said low order bits to select the banks of said memory devices in turn;

clock means coupled to the analog-to-digital converter and to the memory for supplying clock pulses at a selected frequency;

start-up control means having a synchronizing input coupled to a synchronizing output of the video unit, means for supplying a START command from the computer via the interface circuit to set the start-up control means to a run state, means effective with the start-up circuit in the run state and responsive to a pulse at the synchronizing input for starting a digitizing sequence;

means effective during said digitizing sequence for coupling clock pulses for the clock means to the address counter means to advance an address count on each clock pulse, so that the memory decode circuit enables the memory banks in turn to store the address in the address register means and the data word form the digital output line in the data register means, and in each of said plurality of banks the data word form the data register means is stored in the memory devices at the address from the address register means for the bank of said memory devices which is selected by said X low order bits.

2. The digitizer according to claim 1, further including read driver means coupled between the memory and the interface data lines, including an output driver associated with each of said plurality of banks;

means effective during a memory read sequence for producing a read clock pulse in response to a clock control command from the computer at the interface circuit, means for coupling the read clock pulse form the interface circuit via the clock means to the address counter means to advance an address count on each read clock pulse, so that the memory decode circuit enables the memory banks in turn to store the address in the address register means and to enable the output driver for the bank of said memory devices which is selected by said X low order bits, and means responsive to a memory read command form the computer to enable data read form said bank of said memory devices which is selected by said X low order bits to be supplied to the computer via the interface data lines.

3. The digitizer according to claim 2, wherein the interface circuit includes:
- an address select circuit (U4A, U11 and U12) having inputs from the interface address lines and interface control lines for decoding computer addresses received on the interface address lines when enabling signals are received on the interface control liens, so that the address select circuit provides decoded outputs which are commands, including said clock control command and said memory read command;
- a first driver which is part of said read driver means, and which is enabled by said memory read command;
- a second driver having an input from the address counter means for an end count signal, one of the outputs form the address select circuit being coupled to the second driver as a command to enable it for reading the end count signal and coupling it to one of the data interface lines to the computer; and
- a set of interface registers clocked by commands form the address select circuit to store information including a starting address and an address load command form the interface data lines, wherein said set of interafce registers further includes a group of three registers having respective inputs from three of the interface data liens and outputs to lines for said START command, a PRESET command and a CLEAR command, said group of three registers being clocked to store information in response to one command from the address select circuit.

4. The digitizer according to claim 3, wherein the start-up control means includes a clock gate which is part of the means for coupling clock pulses form the clock means to the address counter means, and a set of start-up control flip-flops;
- the set of start-up control flip-flops having inputs from the interface registers of the START, PRESET and CLEAR commands, a clock input form the clock means, and the synchronizing input, and having outputs to FLOW and WRITE lines to the memory, and an output connected to an input of the clock gate;
- said digitizer operating in a first mode in which a combination of the START, PRESET and CLEAR commands set the start-up control clip-flops to a first state in which the clock gate is enabled to gate a clock pulse to the address counter means, clock control command and the address load commands are active, so that a starting address form the interface registers is loaded into the address counter means;
- said digitizer operating in a second mode in which a combination of the START, PRESET and CLEAR commands set the start-up control flip-flops to a second state in which the clock gate is disabled and the address load command is made inactive;
- the start-up control flip-flops being set in response to the START command to provide said run state, in which the synchronizing pulse causes the start-up control flip-flops to be set to a state for the digitizing sequence with the clock gate enabled to pass clock pulses.

5. The digitizer according to claim 4, wherein the clock means includes clock select means having inputs for a plurality of frequencies form a generator and a divider, for an external clock signal, and for the clock control command from the interface circuit, selection inputs coupled to outputs from the interface registers of the interface circuit for controlling selection of the frequency, an output form the clock select means providing the clock input to the start-up control means, and an output from the clock select means being connected to provide the clock pulses to the analog-to-digital converter and to the memory.

6. The digitizer according to claim 5, wherein each of said plurality of banks comprises a given number of memory devices and a select unit, and wherein in each of said banks some of the outputs from the address register means are connected to all of the memory devices, and other outputs from the address register are connected to the select unit, outputs of the select unit being connected to chip select inputs of respective memory devices;
- wherein the coupling between the analog input of the analog-to-digital converter and the video output of the video unit includes an operational amplifier;
- wherein the coupling between the synchronizing input of the start-up control means and the synchronizing output of the video unit includes a synchronizing pulse input comparator.

* * * * *